United States Patent [19]

Hong

[11] Patent Number: 5,652,829
[45] Date of Patent: Jul. 29, 1997

[54] FEATURE MERIT GENERATOR

[75] Inventor: Se June Hong, Yorktown Heights, N.Y.

[73] Assignee: International Business Machines Corporation, Armonk, N.Y.

[21] Appl. No.: 281,191

[22] Filed: Jul. 26, 1994

[51] Int. Cl.$^6$ .................................................. G06F 17/00
[52] U.S. Cl. ................................. 395/75; 395/51; 395/62
[58] Field of Search .................................. 395/75, 77, 60, 395/10, 13, 50–51, 61, 62

[56] References Cited

U.S. PATENT DOCUMENTS 4,658,429  4/1987  Orita et al. ................................. 382/36

OTHER PUBLICATIONS

Winston, Patrick Henry. "Artificial Intelligence". Third Edition. Addison–Wesley. 1992.

Zhou, Xiao Jia, and Tharam S. Dillon. "A Statistical–Heuristic Feature Selection Criterion for Decision Tree Induction." IEEE Trans. on Pattern Analysis and Machine Intelligence. vol. 13, No. 8. Aug. 1991.

Fung, P.W., G. Grebbin, and Y. Attikiouzel. "Contextual Classification and Segmentation of Textured Images." ICASSP '90: Acoustics, Speech & Signal Processing Conference. 1990.

Primary Examiner—Tariq R. Hafiz
Attorney, Agent, or Firm—Stephen C. Kaufman

[57] ABSTRACT

The invention discloses steps to compute a new contextual merit measure for feature variables based on a two-fold discovery. First, a feature variable does not exist by itself in distinguishing classes, and second, what is desired is to obtain its correlation to a class in the context of other feature variables. The invention specifies a merit measure that captures the contextual correlation implicitly.

23 Claims, 14 Drawing Sheets

18

|  | $X_1$ $X_2$ ... $X_{N_s}$ | $X_{N_s+1}$ ... $X_{N_f}$ | Class |
|---|---|---|---|
| $N_1$ | Symbolic Features | Numeric Features | C1<br>C1<br>.<br>.<br>.<br>C1 |
| $N_2$ | | | C2<br>C2<br>.<br>.<br>.<br>C2 |
| | $N_s$ | $N_n$ | |

$N_1 + N_2 = N$ total examples $N_s + N_n = N_f$ total features

FIG. 2
EXAMPLES

THE RAMP FUNCTION

MODIFIED RAMP FUNCTION

CUT-SCORE-CURVE

FLOWCHART FOR DISCRETIZATION OF NUMERIC FEATURES (NFD)

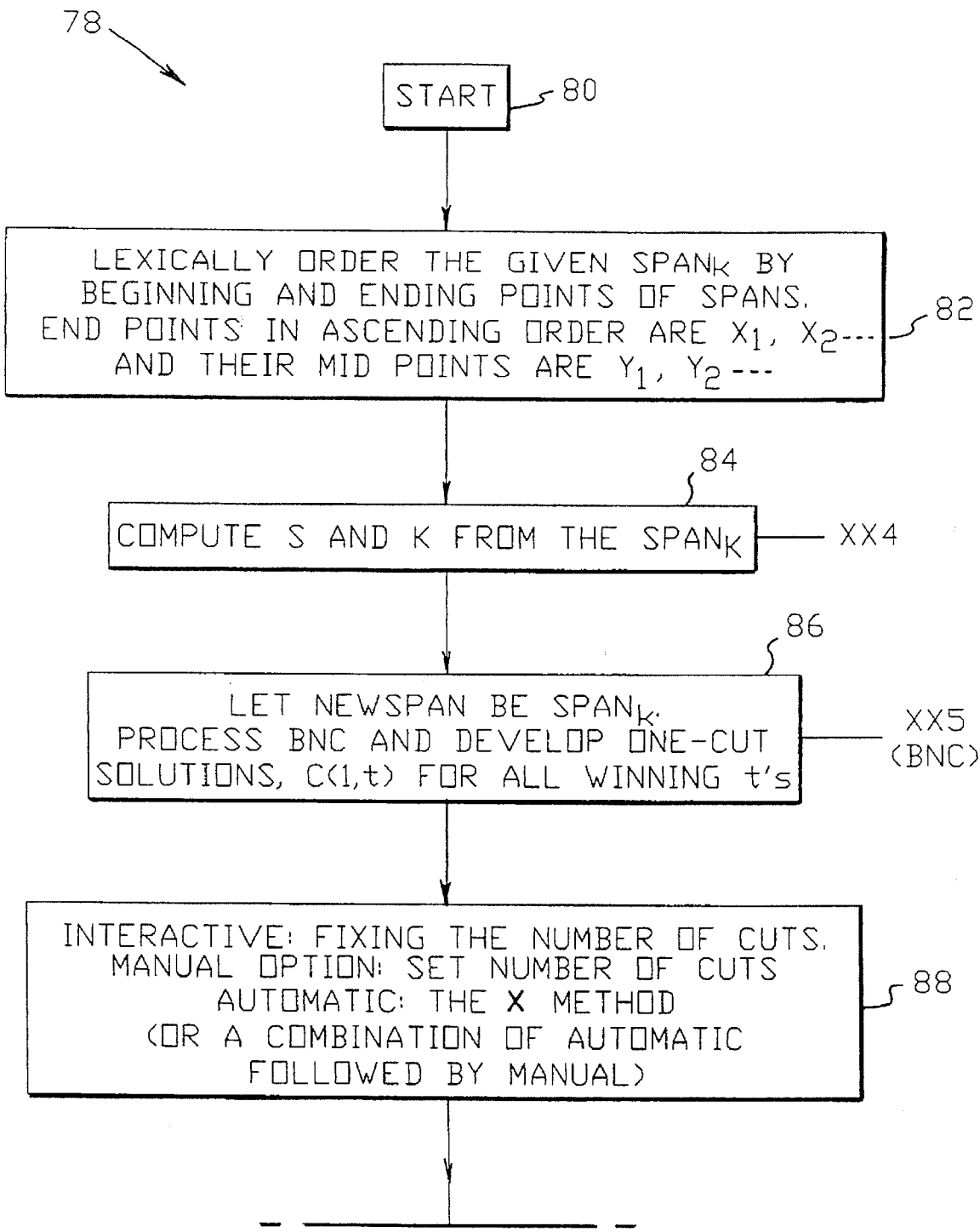

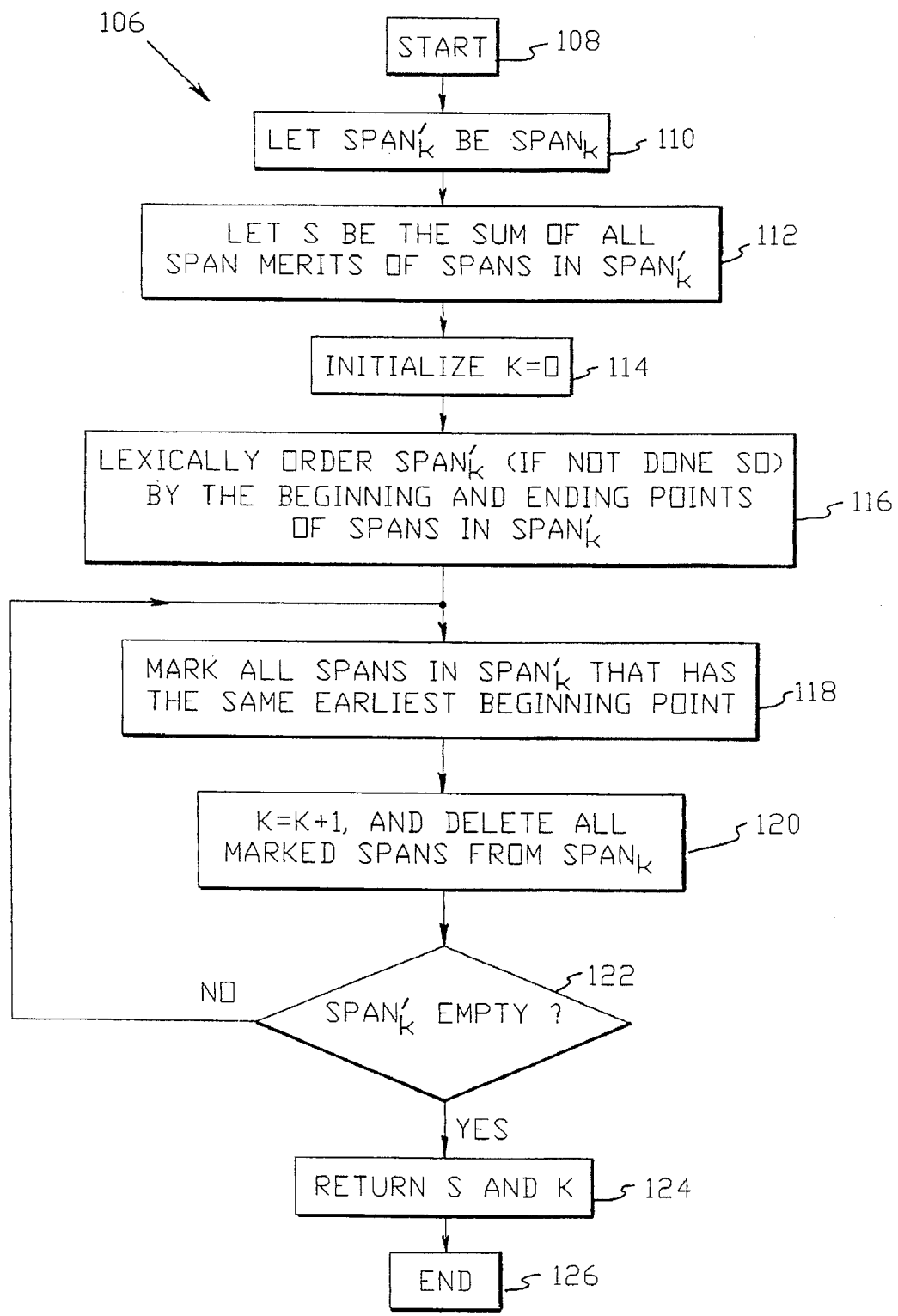

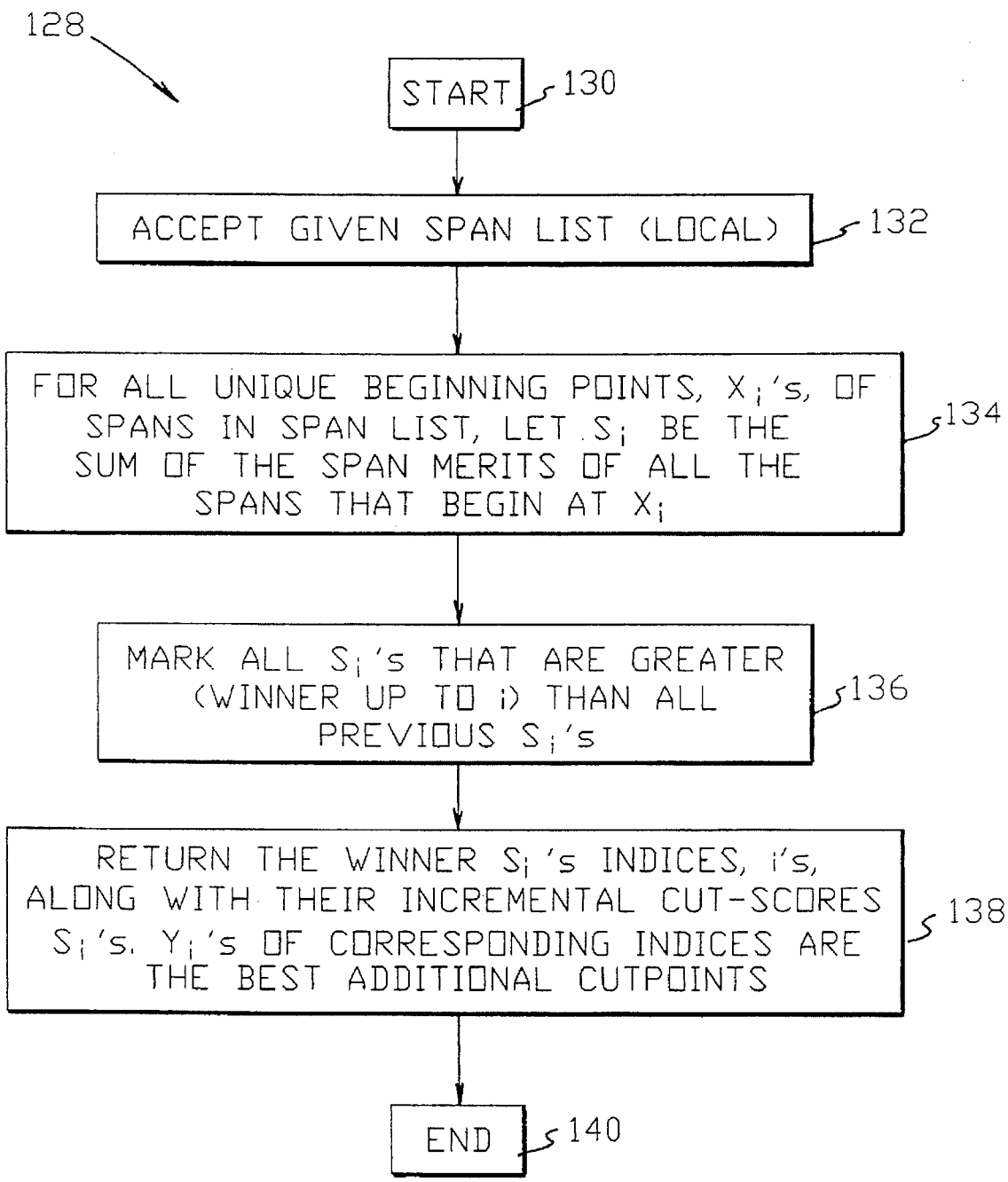

FEATURE MERIT GENERATOR

BACKGROUND OF THE INVENTION

This invention relates to a feature merit generator and method suitable for use in developing classificatory decision rules or decision trees from examples.

INTRODUCTION TO THE INVENTION

Developing classificatory decision rules or decision trees from examples is an important and known problem. See, for instance, Breiman et al 1993, "Classification and Regression Trees," Chapman and Hall, New York and consider the following scenario (FIG. 1), developed for the sake of pedagogy.

The FIG. 1 schematic includes a column 10 comprising a set of useful class discriminators, wherein each class discriminator denotes a spectrum of car prices; a column 12 comprising a plurality of class examples, wherein each class example comprises a vector 14 of feature variables e.g., weight, color, manufacturer, et cetera; and, a classification decision rule vector 16 which gainfully incorporates a value of a feature variable, to an end of determining a class of an unseen or future example. A particular rule vector 16 may state, for example, that if the feature variable color for the class example, $car_3$, is green, then the class discriminator is class 2 i.e., $car_3$ costs from ten to twenty thousand dollars.

SUMMARY OF THE INVENTION

We have asserted that a classification decision rule may depend on the value of a feature variable. In this regard, we note that many real problems, especially those arising e.g., from text categorization or manufacturing process data, are known to contain hundreds to thousands of feature variables comprising a large aggregate set.

For these problems, we cite a pragmatic advantage in dealing with a smaller number of feature variables than those comprising the large aggregate set. For example, from a computational point of view, it may be advantageous to deal with a smaller number of feature variables, notwithstanding a potential concomitant degradation in the "quality" of the classification decision rules, due to a loss of flexibility afforded by the discarded feature variables.

Moreover, we observe that a practical advantage may be realized if a capability exists for pruning or culling "insignificant" or "weak" feature variables from the large aggregate feature variable set, before deriving classification decision rules.

This "culling action" is often accomplished automatically in the course of developing decision trees. To this end, it is known to use techniques e.g., including information theoretic or statistical correlation between each feature variable and the class, for effecting the culling action. We have critically analyzed the important and illustrative prior art information theoretic and statistical correlation techniques, towards an end of developing a new and powerful alternative for culling insignificant or weak feature variables from a large aggregate feature variable set.

In conceptual overview and from the vantage point of the present invention, we have determined that the methodologies underlying the illustrative prior art techniques may comprise immanent delimitations—moreover, that the cited prior art methodologies may be enveloped by the discoveries of the present invention, which we now recite.

Accordingly, the present invention in a first aspect comprises a novel feature merit generator suitable for use in developing classificatory rules or decision trees from examples. The feature merit generator comprises:

1) means for identifying a set of useful class discriminators;

2) means for representing a plurality of class examples, wherein an example comprises a vector of feature variables; for a given class example of interest 3) means for determining a merit factor as an indicia of the vector of feature variables by comparing that feature's obligational dependency to a class discrimination in a context of corresponding feature variables in at least one counter example, thereby generating a feature variable ranking for the given class example of interest; and 4) a rule means incorporating said merit factor for classifying the given class example to an appropriate class.

The present invention is disclosed in a second aspect as a feature variable ranking method. The method comprises the steps of:

1) representing a plurality of class examples, wherein an example comprises a vector of feature variables;

2) processing a given class example of interest;

3) generating a merit factor for the given class of interest by a step of sequentially comparing corresponding elements of the examples' feature variables to corresponding elements in at least one of a counter examples' vector of feature variables, the step of comparing comprising;

4) generating merits for specified feature variables by finding that specified feature variable's obligational contribution to the class discrimination in a context of the counter examples' corresponding feature variables.

The novel feature merit generator and method of the present invention can realize significant advantages. In brief, we have discovered a new contextual merit function for feature variables. This discovery subsumes the fact that a feature variable does not exist by itself in distinguishing the classes, and that what is desired is to obtain its correlation to the class in the context of other feature variables. Restated, since an enumeration of all possible context is impractical, we specify a merit function that captures this contextual correlation implicitly.

Since determining the relative importance of feature variables is at the heart of all practical decision tree generation algorithms, powerful advantages realized by the present invention are now thought to be self-evident. In this regard, note that the prior art is silent as to these conceptual breakthroughs and modes of realization, and thus stands in sharp contrast to the present invention.

The present invention, furthermore, has a significant advantage since the notion of contextual information can be used for variable feature ranking and discretization. To this end, we develop below unique insights and methodologies to problems identified as a "Variety Effect" and a "Ramp Effect".

BRIEF DESCRIPTION OF THE DRAWINGS

The invention is illustrated in the accompanying drawing, in which:

FIG. 2 shows an example array;

FIGS. 9–13 provide flowcharts for steps implemented by the FIG. 8 machine.

DETAILED DESCRIPTION OF THE INVENTION

Figure 1:
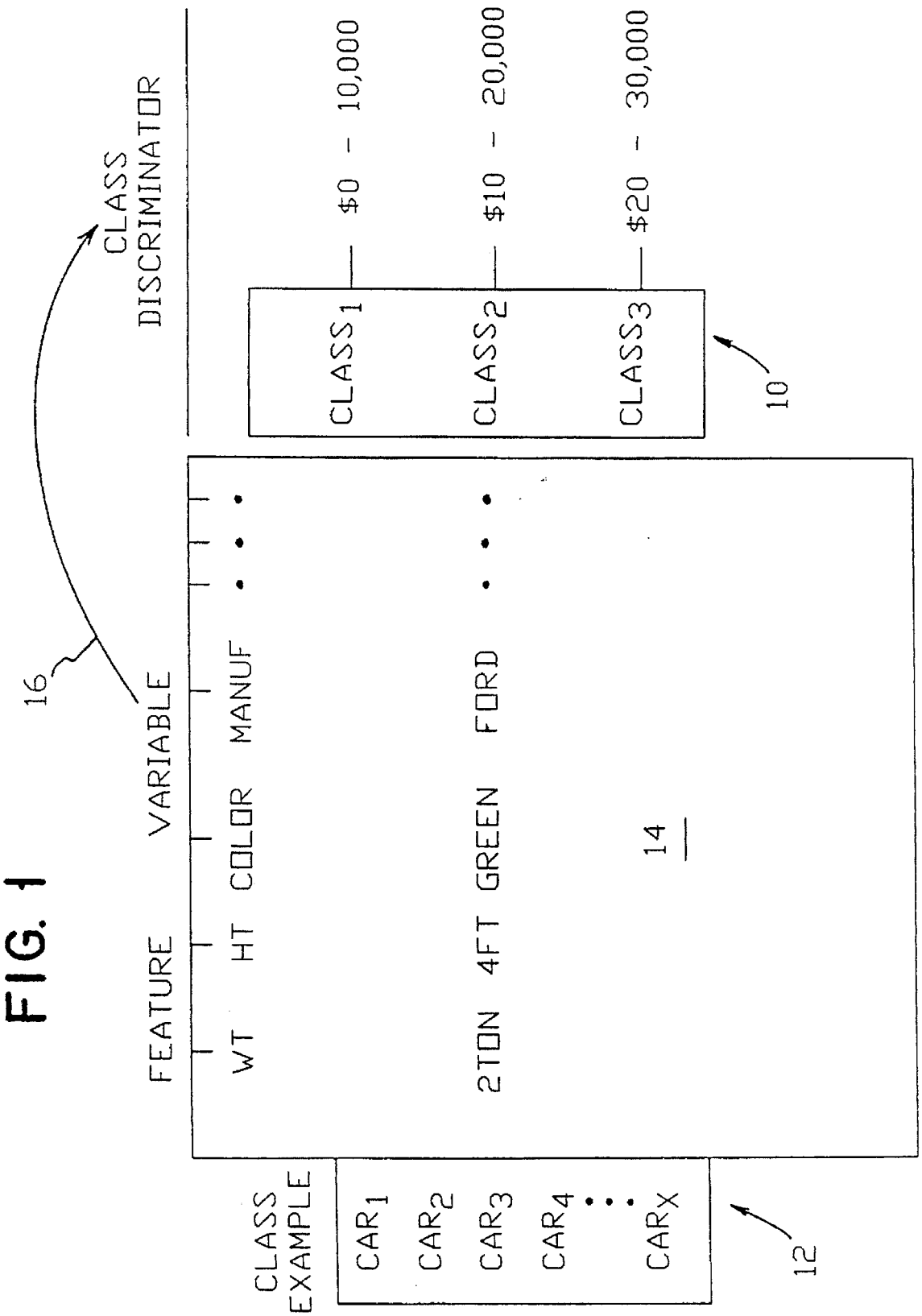
FIG. 1 provides a background example for the present invention.

We now reference the present invention by first setting forth a conceptual backdrop and detailed insights into various aspects of the prior art. This approach, when set in apposition to a following detailed description of the present invention, can highlight novel aspects of the present invention.

I. Introductory

Note firstly that this invention does not address how to find new or derived features other than the ones explicitly given at the outset. Linear or other functional combinations of several numeric features may very well serve as a better feature or even as a good discriminator by itself. The pattern recognition community and the statistical regression community have traditionally pursued this. We rely on the domain experts having provided such useful derived features as part of the example data, and deal exclusively with the given feature set. In other words, this invention is focused on only discriminating (locally in a test) by hyperplanes orthogonal to the axes of features in the multidimensional feature space where examples reside.

We regard the problem of missing values as a separate issue and assume all feature values are specified for all examples. The noisy data problem is indirectly but quite effectively handled by the inherent robustness of our approach and we do not address the problem of over-fitting in a direct way in this invention.

II. Common characteristics of traditional decision tree generation.

Determining the relative importance of features is at the heart of all practical decision tree generation methods. An exception to this is when some enumerative scheme is used to generate an absolute minimum expression tree, but any such process must pay an exponential computational cost in terms of the number of features present. Aside from decision trees, determining a most relevant subset of features for the classification task is important on its own. A set of examples (usually a subset of the original example set in the tree generation process) contains examples that belong to many classes. (If a subset contained examples of only one class, no more tests need be applied to the decision path that led to the separation of the subset from its superset). The degree of uncertainty about the classes of examples in a set is often called its class impurity or chaosness. Let $P_i = n_i/N$, where $n_i$ is the number of examples whose class is $i$ and $N = \Sigma n_i$, the total number of examples in the given set. The information theoretic measure for the chaosness is the entropy function on the probabilities, $H(\text{class}) = -\Sigma P_i \log P_i$. A statistical measure often used is the Gini Index, $G(\text{class}) = 1 - \Sigma P_i^2$. For binary trees, a new measure of chaosness may be based on the degree of orthogonality of class profiles on the two daughter subsets induced by the given test. For VLSI logic synthesis a minimal decision lattice has been pursued as well.

When a given set of examples is tested on a variable/feature, it is partitioned into subsets such that each subset contains only the examples of a unique value of the variable tested. Each of these subsets has its own chaosness whose weighted average (weighted by the size of the subsets) reflects the improvement due to the variable. The "best" variable to test for the given set of examples is then the one that produces the smallest average chaosness, in most of the traditional approaches. An alternative way of selecting the "best" variable is to use some kind of correlation measure between the variable and the class. In information theoretic approach this takes the form of the Information from the variable to the class, defined as $I(\text{class:variable}) = H(\text{class}) - H(\text{class/variable})$. $H(\text{class})$ is common to all variables for it is the chaosness of the set being partitioned. $H(\text{class/variable})$ is exactly the weighted chaosness of the partitioned subsets induced by the variable, which makes the Information correlation approach equivalent to the simple minimal chaosness scheme. Statistical approaches use statistical correlation functions on the variable v.s. the class.

All decision tree generation techniques start with the entire training set of examples at the root node. The "best" feature is selected as the test and the resulting partition of the examples recursively induce the new "best" feature selection for each subset, until the subset is "pure" to the desired degree. A minimal feature subset can be obtained by a slight variation: at each level of the tree, all the partitioned subsets (i.e., the nodes at current level) are tested for a common "best" feature, instead of independently processing each subset. When all subsets are "pure" at the bottom, all the features that appear on the tree usually form a reasonably minimal feature set. (Of course, the tree induced by this process would not be as minimal as the tree of a fully recursive tree generators.)

Whether the "best" variable is selected from the view point of minimal resulting chaosness or the maximal correlation to the classes, all of these approaches rely on the single variable's effect on the class distinguishability at each stage of the tree generation. This is problematic especially at the nodes near the root because the context of other features is ignored. One or two, even more levels of look ahead, do ameliorate this problem, somewhat at the cost of steeply increasing computational burden. Many rule generation techniques that are based on generation of a tree as the starting point recognize this weakness of tests performed near the root node.

III. A pathological case: EXOR function

Before we explicitly introduce our new approach to this problem, we examine a well known pathological case, namely the class of problems known as Exclusive-Or functions, or the ODD function on binary variables. An Exclusive-Or function on n binary variables, $X_1, X_2, \ldots, X_n$, takes on the output value of 1 if odd number of the variables are 1, and 0 otherwise. Consider the truth table of this function, that has $2^n$ rows and n+1 columns. For each row the value in the last column (the class value) is 1 if and only if there are odd number of 1s in the first n bits of the row. Here the values 0 and 1 are considered symbolic.

It is readily observed that the information conveyed by each of the variables, Xi, is zero. The statistical correlation between a variable and the class is also identically zero. This is true even if one considered any proper subset of the variables as a tuple and computed information or correlation associated with it and the class. Only when all the variables are considered together, is there perfect information and perfect correlation.

Now consider an expanded EXOR function that takes on extra random variables constructed as follows. First replicate each row of the truth table k times. Then, insert k×$2^n$ by m array of random bits between the first n columns and the last column. Let us call such a function, EXOR(n,m,k×$2^n$). Each row of this new table can now be interpreted as an n+m binary feature example, with its class designation in the last position. For large values of m and k, the minimum set of rules induced from this example set should correspond to the binary EXOR function on the original n variables, or the rules for EXOR(n,0,$2^n$). And these rules should use only the original n variables in its expression. Likewise, a good decision tree should only test on the original n variables, resulting in a full n level binary tree.

We note that most of today's rule generation methods fail to generate the minimal EXOR rules most of the time. While the original EXOR variables have zero correlation to the output, the random variables in general have non-zero correlation to the output. Therefore, all traditional decision tree methods fail to develop the desirable tree, i.e. the random variables tend to dominate the tests near the root, and the relevant variables tend to be tested near the leaves of the tree, resulting in an unnecessarily large tree. Any attempt to use traditional decision tree approach to select a reduced relevant feature set would fail, for the same reason, on functions like EXOR(n,m,k×$2^n$). Although it is frequently argued that in most of the "real" problems nature is kind and it does not present EXOR like problems, our experience shows that EXOR like behavior is imbedded within many real problems.

IV. A new contextual merit function for features

It is self evident that a feature does not exist by itself in distinguishing the classes. We have discovered a way of obtaining its correlation to the class in the context of other features, a discovery which was lacking in the prior art. Since an enumeration of all possible context is impractical, we look for a merit function that captures this contextual correlation implicitly.

Consider a set of N examples with $N_s$ symbolic, or categorical, features and $N_n$ numeric features. We will assume that such an example set is represented by an N by $N_f(=N_s+N_n)$ array of feature values along with a length N vector of class labels, called C. The class label is always symbolic. Further assume for now that there are only two classes, and the examples are grouped by the class labels, $C_1$ and $C_2$, each having the first $N_1$ and the next $N_2$ examples respectively. $N_1+N_2=N$. Let the examples in class $C_1$ be represented as $e_i$, $1 \leq i \leq N_1$, and those of $C_2$ as $e_j$ $1 \leq j \leq N_2$. Associated with each example is an N tuple feature vector, $e_t=(x_{1t}, x_{2t}, \ldots, x_{kt}, \ldots, x_{N_f t})$ where t stands for either i or j. This N-tuple is just a row of the example array. FIG. 2 (numeral 18) depicts the situation.

We now define a distance measure D(i,j) between two examples.

$$D(i,j) = \sum_{k=1}^{N_f} d_k(i,j) \quad (1)$$

where for a symbolic feature, $X_k$, $$d_k(i,j) = 0 \text{ if } x_{ki} \text{ and } x_{kj} \text{ are same} \quad (2)$$
$$= 1 \text{ if } x_{ki} \text{ and } x_{kj} \text{ are different}$$

and for a numeric feature, $X_k$, $$d_k(i,j) = (|X_{ki} - X_{kj}|)/t_k \text{ if} \quad (3)$$
$$|x_{ki} - x_{kj}| \leq t_k$$
$$= 1 \quad \text{otherwise}$$

The value, $t_k$, is a feature dependent threshold, designed to capture the notion that if the difference is "big enough", the two values are likely to be different when discretized, hence the component distance of 1. However, if the difference is less than the threshold, its distance is a fraction as shown above. This formulation coincides with the probability of an interval length $|x_{ki}-x_{kj}|$ having its ends in two distinct bins, if the range of the feature were equally cut into consecutive bins of size $t_k$. It is not true that the optimal discretization of $X_k$ will have equal interval lengths, but we use this as an estimate. Let us assume for the time being that we have a vector of $t_k$'s, denoted as T. We will discuss how the tk's are actually estimated in section VI later.

Figure 3:
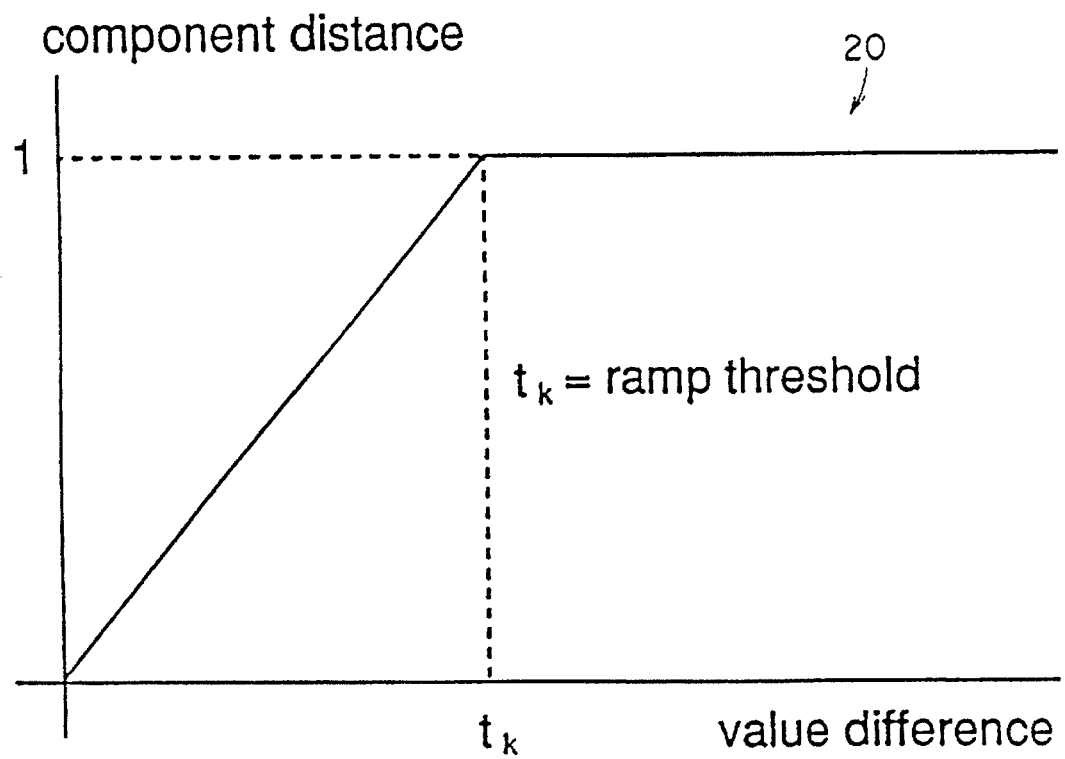
FIG. 3 shows an embodiment of the present invention that utilizes a ramp function.

In pattern recognition, learning techniques, and in case based reasoning, the distance between two examples is often computed by a similar formulae as eqs.(1–3). However, eq.(3) is a subtle but an important departure. Usually, the difference is normalized (divided) by the magnitude of the range of the variable as the component distance. A preferred ramp function of the present invention is shown in FIG. 3 (numeral 20). We claim that a ramp function is generally a better choice than a straight line.

We remark here that the 0, 1 values used as the component distance for symbolic features in eq.(2) can be changed to take on any value between 0 and 1. This would be useful when certain symbolic values of a feature are closer to each other than some of the other values. For instance, if color were a feature, distance between yellow and yellow-green, or between magenta and pink may be justifiably less than that between red and blue which would be 1. The validity of our feature analysis is not affected by such domain dictated values for component distance between symbolic values.

Before introducing a formal definition of the new merit function, let us consider for a moment, an example set that has only symbolic features. Suppose an example in class $C_1$ and a counter example in class $C_2$ has all the feature values identical except in two features, say, $X_2$ and $X_7$. The distance between the two examples is 2. Then these two features are the sole contributors in distinguishing the classes of the two examples, and hence are "responsible" or "obliged." We might say that the magnitude of the obligation is inverse of the distance, ½, which should be shared equally by $X_2$ and $X_7$, i.e., shared in proportion to their component distances. This is the key observation. The merit contribution to $X_2$ and $X_7$ from these example pairs reflects their contribution in the context of all other features in an implicit way without enumerating the contexts themselves.

For each example in $C_1$ we compute the distances to all the counter examples in $C_2$, and retain for merit considerations only some fraction of the counter examples that are nearest to the example. Our rationale is that the counter examples that are far from the example will only contribute noise to the process, and they would be distinguished from the example easily anyway since the distance is relatively large. This philosophy is similar to that of k-nearest neighbor schemes. We shall retain k=$\log_2 \times N_2$ of the nearest upper integer portion thereof. Each of the counter examples chosen for the example contributes its 1/D distributed to the features in proportion to their component distance, $d_k$, i.e. $d_k/D^2$, to the respective merit values of the features. (The i and j indices of D and $d_k$ of eq(1) are dropped for convenience here). The quantity 1/D can be viewed as the degree of independence of the distance contributing features in the given context, or the strength of the context. (Any strictly decreasing function of D would model the situation. See the conclusion section for more discussion on this). The steps for generating contextual merit values for the features, $M=(m_1, m_2, \ldots, m_{N_f})$, are as follows. We make use of $M_i=(m_{1i}, m_{2i}, \ldots, m_{N_f i})$ as the contribution to M from each example $e_i$ of the class, $C_1$. Initializing a vector, here, means that it is set to an all 0 vector.

Steps for Generating Contextual Merit (CM):

CM0) Initialize M

CM1) Compute the numeric threshold vector T for numeric features.

CM2) For each ei of class $C_1$, do

CM2.0) Initialize $M_i$

CM2.1) Compute distances to all examples of $C_2$ and let $\log_2 N_2$ (at least 1) of the nearest distance counter examples be the BESTSET.

CM2.2) For each counter example, $e_j$, in the BESTSET, do

CM2.2.1) Compute $M_{ij}$ by $M_{kij}=d_{kij}/D_{ij}^2 \forall k$

CM2.2.2) Update $M_i: M_i = M_i + M_{ij}$

CM2.3) Update $M: M = M + M_i$

CM3) Return M

We now digress to the EXOR case and observe the behavior of the CM process. Although this is an all symbolic feature case, it exhibits many salient characteristics of this method.

V. Contextual merits of the EXOR function features

First, we state once more that the traditional techniques based on information theoretic or statistical correlation are incapable of finding higher merits for the base variables than for the random variables. The contextual merits of CM method can, and does so in a rational manner. We defined $EXOR(n, m, k \times 2^n)$ earlier.

While this family of functions demonstrate the merits more clearly, it is even more interesting to see the merits when the function is made fuzzier. Notice that the truth table entries of the base case, $EXOR(n, o, 2^n)$ are repeated exactly k times in the above formulation. This may seem "unnaturally" constrained. For any M, sufficiently greater than $2^n$, let us redefine EXOR(n, m, M) constructed as follows. Let $k'=2 \times M/2^n$ (upper integer portion thereof). First, construct the earlier $EXOR(n, m, k' \times 2^n)$. The number of examples in this table is at least twice M. A random subset of M entries from this table is now defined as EXOR(n, m, M), which contains M examples and the entries of the base table are not replicated exactly the same number of times. The optimal rules and decision trees derived from this EXOR should be identical to the base case as discussed earlier.

Cases 1a–d) shows the contextual merits computed by the CM method for four different cases of EXOR(4, 10, 1000). These are shown to demonstrate that random variations in EXOR cases do not change the qualitative meaning of merit values. For all the EXOR cases shown here, the first n variables, $X_0, X_1, \ldots, X_{n-1}$, denote the base EXOR variables. The m random variables are $X_n, X_{n+1}, \ldots, X_{n+m-1}$. In the sequel, the merits of variables are shown in 3 by n+m matrices. The first row shows the ordinal ranks, the second row shows the index, i, of the variable, $X_i$, and the third row the merits which were decimal shifted and rounded so that the maximum merit becomes a three digit number. The minimum of merits for $X_0$–$X_3$ of the case 1a) is 176 belonging to $X_3$. The best merit of the random variables is 93 belonging to $X_6$. Let us define by distinguishing ratio, DR, the ratio between the merits of worst base variables and the best of the random or unnecessary variables. The DR for the case 1a) is 176/93=1.89. We might say that the CM succeeds for EXOR if DR>1 and fails if DR<1. The DR values are depicted to the right of each example below. The DR for cases 1a–1d demonstrates that CM is rather robust in the face of random variables. They are: 1.89, 1.97, 1.74, 1.75.

Case 1a) CM EXOR(4, 10, 1000)

SYMBOLIC VARIABLE MERITS ARE:

| 0 | 1 | 2 | 3 | 4 | 5 | 6 | 7 | 8 | 9 | 10 | 11 | 12 | 13 | |
|---|---|---|---|---|---|---|---|---|---|---|---|---|---|---|
| 0 | 2 | 3 | 6 | 12 | 11 | 7 | 4 | 8 | 10 | 5 | 9 | 13 | | |
| 194 | 184 | 176 | 176 | 93 | 93 | 92 | 90 | 89 | 89 | 89 | 87 | 87 | 87 | (176/93 = 1.89) |

Case 1b) CM EXOR(4, 10, 1000)

SYMBOLIC VARIABLE MERITS ARE:

| 0 | 1 | 2 | 3 | 4 | 5 | 6 | 7 | 8 | 9 | 10 | 11 | 12 | 13 | |
|---|---|---|---|---|---|---|---|---|---|---|---|---|---|---|
| 1 | 2 | 3 | 0 | 11 | 8 | 13 | 6 | 7 | 10 | 12 | 9 | 5 | 4 | |
| 189 | 182 | 181 | 177 | 90 | 89 | 89 | 88 | 87 | 85 | 85 | 84 | 82 | 81 | (177/90 = 1.97) |

Case 1c) CM EXOR(4, 10, 1000)

SYMBOLIC VARIABLE MERITS ARE:

| 0 | 1 | 2 | 3 | 4 | 5 | 6 | 7 | 8 | 9 | 10 | 11 | 12 | 13 | |
|---|---|---|---|---|---|---|---|---|---|---|---|---|---|---|
| 2 | 1 | 0 | 3 | 8 | 4 | 12 | 13 | 6 | 10 | 11 | 9 | 7 | 5 | |
| 194 | 185 | 174 | 162 | 93 | 91 | 89 | 89 | 88 | 87 | 87 | 86 | 85 | 84 | (162/93 = 1.74) |

Case 1d) CM EXOR(4, 10, 1000)

SYMBOLIC VARIABLE MERITS ARE:

| 0 | 1 | 2 | 3 | 4 | 5 | 6 | 7 | 8 | 9 | 10 | 11 | 12 | 13 | |
|---|---|---|---|---|---|---|---|---|---|---|---|---|---|---|
| 0 | 2 | 1 | 3 | 4 | 5 | 8 | 10 | 6 | 11 | 12 | 7 | 9 | 13 | |
| 186 | 186 | 182 | 168 | 96 | 92 | 90 | 90 | 89 | 89 | 89 | 87 | 85 | 84 | (168/96 = 1.75) |

Having established the robustness of the merits, we show a few more cases of EXORs with different parameters. Case 2) has n=5 v.s. n=4 before. One immediately notices that the DR is decreased to 127/95=1.34. As we take it further and make n=6, keeping the same values of m and M, as in case 3), we see that DR decreases further to 898/823=1.09. The DR for n=7 becomes less than 1, and CM fails for EXOR(7, 10, 1000).

Case 2) CM EXOR(5, 10, 1000)
SYMBOLIC VARIABLE MERITS ARE:

| 0 | 1 | 2 | 3 | 4 | 5 | 6 | 7 | 8 | 9 | 10 | 11 | 12 | 13 | 14 | |
|---|---|---|---|---|---|---|---|---|---|---|---|---|---|---|---|
| 4 | 0 | 2 | 3 | 1 | 6 | 7 | 5 | 9 | 10 | 8 | 13 | 14 | 12 | 11 | |
| 141 | 135 | 131 | 131 | 127 | 95 | 95 | 93 | 93 | 93 | 92 | 92 | 92 | 89 | 85 | (1.34) |

Case 3) CM EXOR(6, 10, 1000)
SYMBOLIC VARIABLE MERITS ARE:

| 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|
| 4 | 5 | 3 | 2 | 0 | 1 | 13 | 11 | 10 | 6 | 12 | 8 | 15 | 14 | 7 | 9 | |
| 965 | 940 | 938 | 931 | 922 | 898 | 823 | 820 | 816 | 815 | 815 | 809 | 797 | 785 | 751 | 741 | (1.09) |

The effect of a repeated variable is clearly shown in the following case 4). We take an EXOR(4, 10, 1000) and copy one of the base variables, $X_3$, into a random variable position, say, $X_4$. The DR here is 184/96=1.92, similar to case 1). But the merits of the modified function behave very differently. The merits of $X_3$ and the new $X_4=X_3$ are very small, in fact being the least. This effect is expected from the way CM method works. Duplicated variables always contribute to the distance by the number of duplicity, and share the merit component by that much smaller portions.

Case 4) AA=EXOR(4, 10, 1000)
CM AA
SYMBOLIC VARIABLE MERITS ARE:

replace the random variable $X_5$ with the EXOR of $X_0$ and $X_1$, and replace $X_6$ with the EXOR of $X_2, X_3$ and $X_4$. The merits for this modified function shows that $X_6$ has about 3 times the merit of the original base variables, $X_5$ has about twice, and these top two variables (with DR=174/89=1.96) are sufficient to represent the whole function. This is a highly desirable property for any merit generator. This effect can also be anticipated from the way CM method works. Furthermore, the original base variables still retain DR=81/58=1.4 over the random variables. It is natural that the new DR=1.4 is slightly higher than the original 1.28, because the modified function has two less random variables. And this DR did not suffer in the face of more powerful $X_5$ and $X_6$ which can totally preempt the original base variables, because they are not duplicates and do not directly interfere with the distances between examples.

Case 5) AA=EXOR(5, 10, 1000)

CM AA

SYMBOLIC VARIABLE MERITS ARE:

| 0 | 1 | 2 | 3 | 4 | 5 | 6 | 7 | 8 | 9 | 10 | 11 | 12 | 13 | |
|---|---|---|---|---|---|---|---|---|---|---|---|---|---|---|
| 0 | 1 | 2 | 3 | 10 | 9 | 5 | 13 | 6 | 12 | 7 | 11 | 8 | 4 | |
| 192 | 187 | 184 | 184 | 96 | 95 | 94 | 93 | 92 | 91 | 90 | 90 | 89 | 86 | (184/96) |

Replace X4 with a copy of X3 in AA
CM AA
SYMBOLIC VARIABLE MERITS ARE:

| 0 | 1 | 2 | 3 | 4 | 5 | 6 | 7 | 8 | 9 | 10 | 11 | 12 | 13 | |
|---|---|---|---|---|---|---|---|---|---|---|---|---|---|---|
| 2 | 0 | 1 | 11 | 6 | 9 | 10 | 5 | 12 | 13 | 8 | 7 | 3 | 4 | X3 = X4 both |
| 282 | 274 | 270 | 105 | 102 | 101 | 101 | 100 | 100 | 98 | 95 | 92 | 32 | 32 | demoted to last |

We now present one more interesting case. We first take an an EXOR(5, 10, 1000) which has DR=118/92=1.28 and

| 0   | 1   | 2   | 3   | 4   | 5  | 6  | 7  | 8  | 9  | 10 | 11 | 12 | 13 | 14 |                |
|-----|-----|-----|-----|-----|----|----|----|----|----|----|----|----|----|----|----------------|
| 1   | 0   | 3   | 4   | 2   | 7  | 9  | 5  | 6  | 12 | 8  | 10 | 14 | 13 | 11 | Note X0–X4 ranks |
| 126 | 125 | 125 | 124 | 118 | 92 | 89 | 86 | 86 | 83 | 81 | 81 | 79 | 78 | 76 | (118/92) |

Replace X5 with the EXOR of X0 and X1 in AA
  Replace X6 with the EXOR of X2, X3, and X4 in AA
CM AA
SYMBOLIC VARIABLE MERITS ARE:

| 0   | 1   | 2  | 3  | 4  | 5  | 6  | 7  | 8  | 9  | 10 | 11 | 12 | 13 | 14 |                  |
|-----|-----|----|----|----|----|----|----|----|----|----|----|----|----|----|------------------|
| 6   | 5   | 0  | 1  | 4  | 2  | 3  | 9  | 7  | 12 | 13 | 10 | 8  | 14 | 11 | Note X6, X5      |
| 241 | 174 | 89 | 88 | 84 | 82 | 81 | 58 | 53 | 53 | 53 | 51 | 50 | 50 | 48 | X0–X4 demoted (81/58*),(174/89 |

Here are some more data in summary form just showing the DR values or the fact that CM failed to assign top merits to the base variables. It is seen that the DR increases with the number of examples, M, and decreases with n more sensitively than it does with m. The parameters at the boundary of failures are meaningful in that they give some concrete values of number of examples needed for CM to succeed, which should be related to the number of examples needed to learn an EXOR function predicted by the VC dimensions in the presence of random variables. In the following what is changed is connected by the dashed lines.

Cases 6a)

```
(4, 10, 1000) --- 1.89, 1.97, 1.74, 1.75, 1.92
  |———
  |
  (4, 10, 200) --- 1.16, 1.28
  |
  (4, 10, 150) --- 1, 1.01, fail
(5, 10, 1000) --- 1.37, 1.28,
  |———
  |
  (5, 10, 500) --- 1.14, 1.04
  |
  (5, 10, 400) --- fail, 1.06
  |
  (5, 10, 350) --- 1.02, fail
(6, 10, 1000) --- 1.09,
  |———
  |
  (6, 10, 500) --- fail
(7, 10, 1000) --- fail
```

Cases 6b)

```
(3, 10, 3200) --- 4.68, 4.84
  |
  (3, 10, 1600) --- 3.1, 3.58, 3.41
  |
  (3, 10, 800) --- 2.59, 2.56
  |
```

-continued

```
(3, 10, 400) --- 1.95
  |—|
    |
    (3, 15, 400) --- 1.35
    |———
    |
    (3, 15, 100) --- 1.03
    |
    (3, 16, 100) --- fail
    |
    (3, 20, 400) --- 1.15
(3, 10, 200) --- 1.46
  |—|
    |
    (3, 20, 200) --- 1.11
(3, 10, 100) --- 1.16
  |—|
    |
    (3, 20, 100) --- fail
(3, 10, 50) --- fail
```

VI. Considerations for numeric features.

Figure 4:
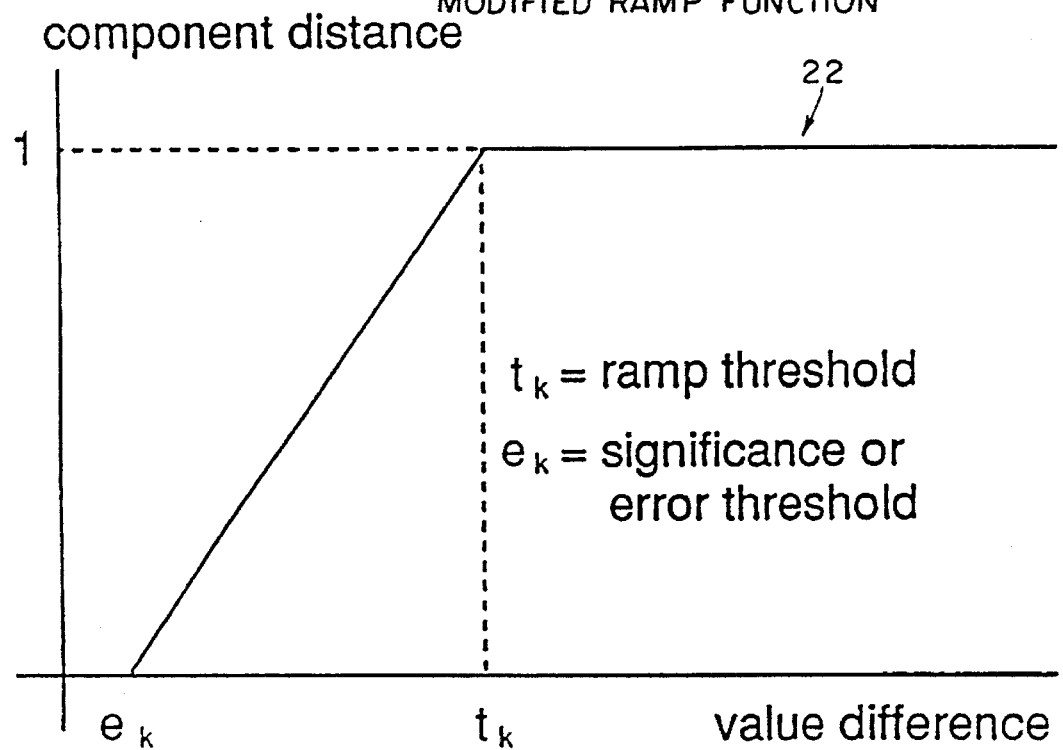
FIG. 4 shows a modified ramp function.

We made use of a ramp function threshold, $t_k$, for a numeric variable, $X_k$, to define its component distance in section IV. If a numeric feature is to be discretized at all, it must have at least two intervals within the range. Therefore, an initial estimate of half of the size of the range seems reasonable, i.e., if a feature X ranges as: $x_0 \leq x \leq x_1$, $t_k$ is estimated as $(x_1-x_0)/2$. Another reasonable approach would be the following. Let $X_{k'}$ and C' be the ordered $X_k$ and the corresponding class labels of the entire example set. As the values of $X_{k'}$ are traversed from one end, the corresponding class labels will change sometimes. Mark all the changes, except when the class labels change while the $X_k$ values do not. We call the average value interval between the marks ANZCCI (Average Non-Zero Class Crossing Interval). When the feature data is noisy or the number of distinct values of the feature is large its ANZCCI tends to become small. We can use some multiples of the ANZCCI, as the value for $t_k$ initially (the implied iteration will be explained later). Experience shows that the final outcome of our feature analysis is rather robust against initial choice of the $t_k$ value. If it is the case that the value range is to be more or less equally partitioned into size t intervals, and if it is known that difference of values less than certain threshold, e, is meaningless (due to, say, the accuracy of the measurement) than it would make more sense to assign the component distance by a modified ramp function as shown in FIG. 4 (numeral 22) below.

Let us now examine a few cases of numeric feature problems corresponding to the EXOR cases for an insight. These cases are derived from cases 6b). Symbolic variables are denoted as 0, 1, etc. and numeric variables as negative numbers −1, −2, etc. We will make use of a randomized transform of the EXOR cases into numeric cases through a process, RANNUM(R, EXOR). RANNUM takes a symbolic matrix and substitutes "0"s with random numbers drawn from 0 through (R−1), and "1"s with random numbers drawn from R through (2R−1), except for the class label column. In all the following cases, the threshold, t, for the ramp function is set to R for all numericized variables, which is ½ of the range as discussed before. (Using t=(R/2) through 2R produces similar results here). When R=1, the RANNUM just makes the symbolic EXOR into a numeric EXOR whose values are to be treated as numbers.

We start from an EXOR(3, 10, 3200) as in the cases 6b). The initial Case 7) is such a symbolic case, which has DR=4.84. The identical merits and DR results if this EXOR function is numericized trivially by a RANNUM with R=1. When this EXOR is made numeric with R=10 (the AAN), and the numbers are deliberately treated as distinct symbols, the distinguishability of the base variables is practically lost. With this much variety in each variables values, the base variables do not convey particularly higher contextual information than the original random variables. This effect is similarly exhibited if AAN is treated as numeric with a very small t. What it means is that some representation simpler than the EXOR rules or trees can model this re-symbolized AAN, not necessarily using only the base variables. The numeric variable merits for AAN is shows that its DR=1.19 is quite smaller than 4.84 of the original EXOR.

Case 7) AA=EXOR(3, 10, 3200)
CM AA
SYMBOLIC VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|----|----|----|---|
| 2 | 0 | 1 | 5 | 6 | 7 | 12 | 8 | 10 | 11 | 4 | 9 | 3 | |
| 182 | 179 | 179 | 37 | 36 | 36 | 36 | 35 | 35 | 35 | 34 | 34 | 33 | (179/37 = 4.84) |

AAN=RANNUM(10, AA)
AAS=treat AAN as if all numbers are distinct symbols
CM AAS
SYMBOLIC VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|----|----|----|---|
| 0 | 1 | 2 | 3 | 7 | 8 | 9 | 4 | 5 | 6 | 10 | 11 | 12 | |
| 132 | 132 | 132 | 132 | 132 | 132 | 132 | 131 | 131 | 131 | 131 | 131 | 130 | (132/132 = 1, fail?) |

CM AAN
NUMERIC VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| −1 | −2 | −3 | −10 | −11 | −4 | −8 | −9 | −13 | −7 | −12 | −5 | −6 | |
| 330 | 330 | 328 | 275 | 274 | 271 | 271 | 271 | 271 | 270 | 270 | 268 | 268 | (328/275 = 1.19) |

The next case demonstrates the same effect as before. With this decreased number of examples, the re-symbolized case lost any resemblance to an EXOR function and the numeric version shows weakened DR.

Case 8) AA=EXOR(3, 10 1600)
CM AA
SYMBOLIC VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| 2 | 0 | 1 | 3 | 9 | 4 | 8 | 6 | 11 | 5 | 10 | 12 | 7 | |
| 634 | 633 | 609 | 170 | 169 | 168 | 168 | 164 | 164 | 161 | 160 | 157 | 156 | (609/170 = 3.58) |

AAN=RANNUM(10, AA)
AAS=treat AAN as if all numbers are distinct symbols
CM AAS
SYMBOLIC VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| 9 | 1 | 12 | 2 | 0 | 7 | 3 | 4 | 6 | 11 | 8 | 10 | 5 | |
| 587 | 584 | 583 | 582 | 581 | 579 | 578 | 578 | 574 | 574 | 573 | 573 | 570 | (fails) |

CM AAN
NUMERIC VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| −1 | −3 | −2 | −6 | −10 | −9 | −8 | −12 | −7 | −11 | −4 | −5 | −13 | |
| 139 | 139 | 137 | 120 | 120 | 119 | 117 | 117 | 116 | 116 | 115 | 115 | 115 | (137/120 = 1.14) |

The following case demonstrates that the numeric versions created by the RANNUM process behave quite similarly even with the random assignment of numeric values. Again, the numeric versions with R=10 exhibits much smaller DR.

Case 9) AA=EXOR(3, 10, 800)
CM AA
SYMBOLIC VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| 2 | 1 | 0 | 5 | 6 | 8 | 3 | 7 | 4 | 11 | 10 | 9 | 12 | |
| 206 | 201 | 200 | 78 | 75 | 73 | 72 | 72 | 71 | 71 | 70 | 69 | 69 | (200/78 = 2.56) |

AAN=RANNUM(10, AA)
CM AAN
NUMERIC VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| −3 | −2 | −1 | −11 | −9 | −4 | −8 | −5 | −7 | −12 | −10 | −6 | −13 | |
| 575 | 572 | 569 | 506 | 502 | 500 | 497 | 494 | 493 | 491 | 489 | 485 | 477 | (569/506 = 1.12) |

Regenerate AAN=RANNUM (10, AA)
CM AAN

| 0 | 1 | 2 | 3 | 4 | 5 | 6 | 7 | 8 | 9 | 10 | 11 | 12 | |
|---|---|---|---|---|---|---|---|---|---|---|---|---|---|
| −3 | −1 | −2 | −8 | −4 | −9 | −10 | −13 | −12 | −5 | −11 | −6 | −7 | |
| 579 | 561 | 560 | 504 | 502 | 500 | 498 | 495 | 493 | 490 | 490 | 486 | 480 | (560/504 = 1.11) |

We round out this series of experiments using cases 10) and 11) showing that numeric version of EXOR(3, 10, 200) already fails in contrast to the EXOR(3, 10, 50) of the cases 6b) when R=10.

Case 10) AAN=RANNUM(10, EXOR(3, 10, 400))
CM AAN
NUMERIC VARIABLE MERITS ARE:

AAN=RANNUM(3, AA)
CM AAN
NUMERIC VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| −1 | −3 | −2 | −6 | −10 | −7 | −8 | −12 | −9 | −4 | −5 | −11 | −13 | |
| 236 | 231 | 229 | 219 | 218 | 214 | 213 | 213 | 212 | 210 | 209 | 209 | 205 | (229/119 = 1.05) |

Case 11) AAN=RANNUM(10, EXOR(3, 10, 200))
CM AAN
NUMERIC VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| −2 | −1 | −3 | −10 | −13 | −6 | −7 | −12 | −8 | −4 | −5 | −9 | −11 | |
| 107 | 100 | 99 | 97 | 97 | 96 | 94 | 94 | 92 | 90 | 90 | 89 | 89 | (99/97 = 1.02) |

Regenerate AAN=RANNUM(10, EXOR(3, 10, 200))
CM AAN
NUMERIC VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| −3 | −1 | −12 | −7 | −8 | −13 | −6 | −2 | −10 | −11 | −9 | −4 | −5 | |
| 105 | 103 | 97 | 95 | 95 | 95 | 94 | 92 | 92 | 92 | 91 | 90 | 89 | (fail) |

The next series of experiments show the effect of R, i.e. the variety of numeric values of a feature has on the relative merits. We start with a symbolic EXOR(3, 10, 1600) and make a series of numeric versions with increasing R. It is observed that the DR value decreases to an asymptote rather fast, in this case approaching 1.16.

Case 12) AA=EXOR(3, 10, 1600)
CM AA
SYMBOLIC VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| 1 | 0 | 2 | 7 | 5 | 6 | 9 | 10 | 12 | 11 | 8 | 3 | 4 | |
| 643 | 612 | 597 | 175 | 170 | 161 | 161 | 161 | 160 | 157 | 156 | 155 | 154 | (597/175 = 3.41) |

AAN=RANNUM (2, AA)
CM AAN
NUMERIC VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| −2 | −1 | −3 | −10 | −12 | −5 | −7 | −9 | −6 | −8 | −4 | −11 | −13 | |
| 159 | 157 | 152 | 123 | 123 | 121 | 121 | 121 | 120 | 119 | 117 | 117 | 116 | (152/123 = 1.24) |

| 0 | 1 | 2 | 3 | 4 | 5 | 6 | 7 | 8 | 9 | 10 | 11 | 12 | |
|---|---|---|---|---|---|---|---|---|---|---|---|---|---|
| -1 | -2 | -3 | -9 | -6 | -12 | -7 | -8 | -10 | -11 | -13 | -4 | -5 | |
| 142 | 139 | 139 | 117 | 116 | 115 | 114 | 114 | 114 | 114 | 114 | 113 | 113 | (139/117 = 1.19) |

AAN=RANNUM(5, AA)
CM AAN
NUMERIC VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| -1 | -3 | -2 | -9 | -4 | -6 | -8 | -12 | -10 | -11 | -5 | -13 | -7 | |
| 137 | 137 | 136 | 117 | 116 | 115 | 115 | 115 | 114 | 114 | 113 | 113 | 112 | (136/117 = 1.16) |

AAN=RANNUM(100, AA)
CM AAN
NUMERIC VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| -2 | -1 | -3 | -4 | -12 | -8 | -10 | -5 | -7 | -9 | -13 | -6 | -11 | |
| 144 | 141 | 140 | 121 | 120 | 120 | 120 | 119 | 119 | 118 | 118 | 117 | 117 | (140/121 = 1.16) |

There are two reasons why the merits of numeric features do not show the relative strengths as sharply as the pure symbolic cases:

1) Variety Effect (VE) It is often the case that numeric features may have many distinct values. It is even conceivable that one such feature alone may be sufficient to distinguish all the classes, if the values are "trusted." In practice, we often use an external knowledge and opt to "trust" the values only within some small set of intervals. This knowledge is exogenous to the data. Another potential source for the small set of intervals may stem from yet another exogenous bias that brings into picture the cost of each "equal" test for symbolic value and each "greater than" test for numeric value as being equal, and attempting to derive an expression minimizing the total cost of tests in the resulting expression. In any case, this kind of external bias has not been explicitly and formally enunciated in any existing feature analysis techniques. (Notwithstanding the fact that some approaches such as C4.5 in effect choose to penalize for the variety in computing the merit of a variable). Cases 7) and 8) clearly demonstrates this effect. Cases 10) and 11) basically demonstrates that the base variables and random variables with the given variety in their values lose relative relevance in modelling an EXOR function faster than in purely symbolic case, as the number of examples decrease. Case 12) shows, however, that if there are sufficient number of examples, the variety effect has a limiting behavior (i.e. with increasing R in the experiment). This is good.

It should be pointed out that the variety is also an issue for symbolic features. In some domains, one of the features may be the names of people or their addresses. Almost without exception one avoids using the distinctions due to such variety be employed in classification rules/trees. One usually replaces such features with higher abstractions that has far fewer varieties. (We assume the symbolic features subjected to our analyses are so prepared). The reason for this may be obvious but it is seldom explicitly present and certainly never in the data itself. This kind of exogenous knowledge should become explicit.

2) Numeric distance function, or Ramp Effect (RE) The second reason for fuzzier relative merits in numeric variables has to do with the CM method itself, specifically in the way the component distance is computed for numeric values. More often than not the component distance would be some intermediate value between 0 and 1 due to the ramp function used, and positive contextual merit contribution would accrue for numeric variables at almost every invocation of CM 2.2.2). Since there is no a-priori way to assign the component distance crisply as in symbolic variables, this situation can not be helped. The result is that this effect will tend to increase the merits of numeric features somewhat (inflation) and also tend to diminish the relative merit differentials (smoothing).

CM is effective against these two effects, VE and RE, when there are only numeric features as seen through these cases, although not as much so as in purely symbolic cases. However, without some reasonable countermeasures to these two effects, the relative contextual merits of mixed symbolic and numeric features would be meaningless. Fortunately, there are several ways to overcome these effects. One way to counteract against VE is to use the external reference knowledge when available. That is, if it is known that a symbolic feature, X, and a numeric feature, Y, are of comparable relevance, and the CM generated merits are m(X) and m(Y) respectively, we can calibrate all the merits of numeric features by multiplying m(X)/m(Y). This is shown in case 13) below. This technique require that we know one reference pair and the varieties of values of numeric features be comparable (this can be measured). Another way is to first discretize the numeric features (here one must be careful not to generate a chicken and egg situation) and then find the contextual merits of the resulting all symbolic problem. (later section). Likewise, the inflating and defusing tendencies due to the RE can be effectively countered as will be shown in a later section when we discuss a discretization technique based on contextual merits.

Case 13) again uses the symbolic EXOR(3, 10, 1600) as the initial case. We do the RANNUM on one of the base variable and all (or all but one) of the random variables to demonstrate one of the VE countermeasures discussed just now. First, note that the numericized base variable still has higher merit than any of the numericized random variables. The symbolic variables now has much smaller merits (last two) due to VE. But the calibrated merits have DR=1.54 for the mixed case. The fact that this is much less than the DR of the all symbolic original case can be largely attributed to the RE, at this point. But the mixed symbolic and numeric feature case is successfully handled. This is shown for both R=5 and R=10 in using RANNUM. The last of this series transformed the original problem such that two base variables as well as on of the random variable were kept symbolic while the rest of the variables were processed through RANNUM. We note that the base variables, both symbolic ones and the numericized one had higher merits than respective random variables. Furthermore, when calibrated with external reference knowledge, the three base variables won with DR=1.58. The one symbolic random variable has merit of 29 compared to the least of the calibrated base variable merit of 89. The ratio between the average numericized random variable merit, 55, and 29 is deemed to be the consequence of the inflation due to the RE. The merit ratio of 89/29=3.06 is in the same league as it was in symbolic case.

Case 13) AA=EXOR(3, 10, 1600) Of the three base variables, X0, X1 and X2, keep the first two as symbolic and take X2 and all the random variables portion for a RANNUM process with R=5. The variable −1 now represent the X2 in this mixed variable case. Call this new case AAM.

CM AAM
MIXED VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| −1 | −3 | −5 | −9 | −11 | −10 | −4 | −6 | −8 | −7 | −2 | 0 | 1 | |
| 203 | 133 | 132 | 132 | 132 | 131 | 130 | 130 | 130 | 128 | 127 | 83 | 83 | 203 > 133 |

Using external knowledge that, say, X1 and X2 (now −1) are comparable in their relevance, we calibrate all the numeric variable merits:

CALIBRATE NUMERIC VARIABLE MERITS (multiply by 83/203 and round) REORDER VARIABLES BY CALIBRATED MERITS:

| 0 | 1 | 2 | 3 | 4 | 5 | 6 | 7 | 8 | 9 | 10 | 11 | 12 | |
|---|---|---|---|---|---|---|---|---|---|---|---|---|---|
| −1 | 0 | 1 | −3 | −5 | −9 | −11 | −10 | −4 | −6 | −8 | −7 | −2 | |
| 83 | 83 | 83 | 54 | 54 | 54 | 54 | 54 | 53 | 53 | 53 | 52 | 52 | (83/54 = 1.54) |

Now using the same symbolic and numeric variables, do the RANNUM with R=10, getting a new AAM.

CM AAM MIXED VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| −1 | −6 | −11 | −4 | −8 | −10 | −2 | −7 | −9 | −3 | −5 | 1 | 0 | |
| 216 | 135 | 135 | 134 | 134 | 134 | 133 | 132 | 132 | 131 | 131 | 81 | 77 | 216 > 135 |

Again using the same external knowledge, we calibrate the numeric variable merits:

CALIBRATE NUMERIC VARIABLE MERITS (multiply by 81/216 and round) REORDER VARIABLES BY CALIBRATED MERITS:

| 0 | 1 | 2 | 3 | 4 | 5 | 6 | 7 | 8 | 9 | 10 | 11 | 12 | |
|---|---|---|---|---|---|---|---|---|---|---|---|---|---|
| −1 | 1 | 0 | −6 | −11 | −4 | −8 | −10 | −2 | −7 | −9 | −3 | −5 | |
| 81 | 81 | 77 | 51 | 51 | 50 | 50 | 50 | 50 | 50 | 50 | 49 | 49 | (77/51 = 1.51) |

This time, using the same AA as before, keep X0, X1 and the first of the random variables X3 as symbolic, and RANNUM the original X2 and the rest of the random variables with R=10, obtaining a new AAM. Now the variable 2 represent the original random variable X3 and −1 represents the third base variable X2.

CM AAM MIXED VARIABLE MERITS ARE:

| 0 | 1 | 2 | 3 | 4 | 5 | 6 | 7 | 8 | 9 | 10 | 11 | 12 | |
|---|---|---|---|---|---|---|---|---|---|---|---|---|---|
| −1 | −9 | −10 | −8 | −4 | −7 | −2 | −3 | −5 | −6 | 0 | 1 | 2 | |
| 241 | 152 | 152 | 151 | 148 | 148 | 147 | 146 | 146 | 146 | 94 | 89 | 29 | 241 > 152, 89 > 29 |

Using the same knowledge, calibrating:
CALIBRATE NUMERIC VARIABLE MERITS (multiply by 89/241 and round) REORDER VARIABLES BY CALIBRATED MERITS:

| 0 | 1 | 2 | 3 | 4 | 5 | 6 | 7 | 8 | 9 | 10 | 11 | 12 | |
|---|---|---|---|---|---|---|---|---|---|---|---|---|---|
| 0 | 1 | −1 | −9 | −10 | −8 | −4 | −7 | −2 | −3 | −5 | −6 | 2 | (89/29 = 3.06) |
| 94 | 89 | 89 | 56 | 56 | 56 | 55 | 55 | 54 | 54 | 54 | 54 | 29 | (89/56 = 1.58) |

We close this section with an observation that Contextual merit is useful even for mixed features as long as the merits are interpreted by a proper calibration process.

VII. Further properties, applications and practical issues

The contextual merit computed by the CM method does capture the relative power of a feature in distinguishing the classes in the presence of other features, sometimes to a fault, in that presence of highly correlated features mutually weaken their importance even when any one of them in the absence of the others is a strong feature. This was evidenced in the case 4) of EXOR experiments shown in the previous section.

Again referring to the EXOR cases, we have shown several where CM "failed." What it means is that even for these cases, the base variables are the most important variables, but CM did not assign higher merits for some of the base variables above all the random variables. We understand this as a limit on the resolution of CM generated merits when there are too many irrelevant features and not enough examples.

Both of these problematic situations can be helped by the following strategy. First generate the merits, and remove the least merit feature. Then regenerate the merits with the remaining features. Repeat this process until the examples still distinguish the classes without generating "too much" conflicts, i.e., some examples of different classes have almost identical feature values. The merits of features that remain should be those of a minimal set of relevant features. This strategy works for the case 4). As soon as one of the repeated base variable is discarded, the other will have high merit the next round. Eventually, all random variables will be discarded and only the base variables will remain. In fact, the "fail" cases shown before will recover by this strategy as well, since the worst merit of the base variables were not the least (not shown in the data), and each time a (worst merit) random variable is discarded, the DR will improve. For case 5), all random variables will be discarded first and then the original base variables, until only X5 and X6 remain.

We have just described the core process by which a minimal set of relevant features can be extracted. The process require repeated CM invocation which is a practical problem. When there are large number of features, say in the hundreds, and if there is a domain knowledge that features are not highly correlated with one another, one can discard a reasonable chunk of least merit features at a time. Alternately, a separate correlation analysis can be done on a set of least merit features, to ensure that highly correlated features, if any, are not altogether discarded in a given round. (It should be pointed out that the concept of distinguishing ratio, DR, was introduced earlier for the sole purpose of illustrating the power of contextual merit on known class of problems, EXORs. It has no other use).

All these issues become moot, if there are insufficient number of examples to begin with. In the cases of EXOR, if there are too many random variables, m, and too little examples, M, the case can admit a smaller rule set using random variables, for which there is no defense. Consider an EXOR(3, 1000, 8), i.e., just the base truth table of 3 variable EXOR with 1000 random variables appended. There is a high probability that among the 1000 random columns of this table one may exactly match the class column, and the function can be represented by just that single variable. The state of the art does not know yet how to characterize a domain in such a way that one can estimate the necessary number of examples to correctly model it in the presence of noise and irrelevant features.

Returning to the CM method, we see that it is class order dependent. For the EXOR family, there is hardly any difference whether we take as $C_1$ the odd examples or the even examples. Our experience shows that when the sizes of the two classes, $N_1$ and $N_2$, are comparable, either direction produces similar results. When there is a large disparity, results may differ in significant ways. In CM, each example in $C_1$ is given a chance to participate in merit contribution to distinguish itself from the counter class, $C_2$. The examples in $C_2$ participates only passively. So it may be the case that the merits may be biased to modelling $C_1$ better than modelling $C_2$. For the practical and benchmark cases we have applied this technique so far, this is not a problematic issue. There are many reasonable ways the CM can be made symmetric, for instance, it can be applied in both directions and the results averaged.

A directly related issue concerns us when there are more than two classes. One can always treat the multiple classes as a series of separate two class problems. Alternately and more practically, we have successfully used the following simple method for all multiple class cases in our experiments. Simply accumulate the merits, first from $C_1$ v.s. rest, then discarding $C_1$, from $C_2$ v.s. rest, and so on, until the last two classes are processed. Again, many reasonable variations are possible.

The CM method is definitely affected by repeated examples within a class and conflicting examples across classes. The latter does not present a big problem because either we can filter out the conflicting examples before applying CM, or just recognize D=0 in CM2.2) and replace it with an arbitrarily large D. The repeated examples represent a special case of biased example set, where the examples are not drawn "fairly" for all the classes.

For purely symbolic cases, the contextual merit serves as an alternative mechanism to select the current test node in a decision tree generation. We expect that this approach will yield improved trees in many cases. When numeric variables are involved, one must contend with VE and RE and use proper countermeasures. We suggest here that the tree generation involving numeric features be carried out after they have been discretized (see next section) so that the problem can be handled as an all symbolic case.

The contextual merits also suggest the key dimensions to be examined when one performs projection pursuit. One would more fruitfully study the projections of combinations of the higher merit feature dimensions, than that of the lower merit ones.

The complexity of the CM method is basically of order $N_f \times N^2$. When the number of examples is large, one can use a random subset of examples to compute the merits. The resolution of relative relevance does decrease by doing this as seen in many cases shown earlier, but the effectiveness is quite robust until the example size becomes too small. Our experience with many large example sets confirms that a subset strategy is practically very useful. First, take a reasonable subset and compute the merits. Compute merits again using a larger subset (say up to double the size), and compare the new merits to the old. If the new merits are more or less in the same order and the merit values more or less in the same proportion, use the new merits. Else, repeat the process with a larger subset. This strategy gets most of the useful information while saving computation when that matters.

We now present another important application of the contextual merit, namely discretization of numeric features, in the following section.

VIII. Optimal discretization of numeric features

It was mentioned in the beginning that the discretization often happens as a byproduct of some tree generation process in traditional techniques. This has an inherent weakness due to the serial nature of selecting the landmark values, or the cut points. Consider a problem where a numeric feature inherently has two or more optimum cut points, i.e. the intervals partitioned by them are meaningful in the problem domain. It is not likely that one of these points will be chosen in a serial process where the one "best" point is sought at a time based on its ability alone to distinguish the classes. Our approach seeks multiple "optimal" cut points based on contextual demands for the separation of values. Even when it is not done serially, if the discretization considers only the given variable's correlation to the class, the result becomes a weaker approximation to the context based consideration we propose here.

Recall the CM step CM2.1) where the BESTSET of nearest counter examples are chosen. We claimed that the current example, ei, and a counter example, ej, in this set had an obligation to be separated with strength, $1/D_{ij}$. This was distributed in proportion to the component distance, $d_{kij}$, as incremental merit contributions. Now we claim that, for each numeric feature of $e_i$ and $e_j$, its pair of values (if distinct) should be subject to separation (into different intervals) with strength, $1/D_{ij}^2$ regardless of its $d_{kij}$. (We have no reason to insist it be the square of 1/D except that this has worked well in our experience. Any strictly decreasing function of D can be used in principle.) We call the example indices, i and j, together with the strength, $1/D_{ij}^2$, a span, which will be specialized later for any individual numeric feature by substituting the actual values of that feature in $e_i$ and $e_j$. We define a new data structure, SPAN, as the list of spans generated in the following modified CM method, CMSG.

Steps for Contextual Merit and Span Generation (CMSG):

CM0) Initialize M, and let SPAN be an empty list of triplets.

CM1) Compute the numeric threshold vector T for numeric features.

CM2) For each $e_i$ of class $C_1$, do

CM2.0) Initialize $M_i$

CM2.1) Compute distances to all examples of $C_2$ and let $\log_2 N_2$ (at least 1) of the nearest distance counter examples be the BESTSET.

CM2.2) For each counter example, $e_j$, in the BESTSET, do

CMSG2.2.0) Append the triplet, (i, j, $D_{ij}^2$) to SPAN

CM2.2.1 ) Compute $M_{ij}$ by $m_{kij}=d_{kij}/D_{ij}^2$ $\forall k$

CM2.2.2) Update $M_i$:$M_i=M_i+M_{ij}$

CM2.3 ) Update M:M=M+$M_i$

CM3 ) Return M

CMSG4) Return (generic) SPAN

The SPAN list thus obtained is used to discretize all the numeric features. It contains $N_1 \times \log_2 N_2$ entries (order N log N). For a numeric feature, $X_k$, we develop a specialization, $SPAN_k$, by substituting the actual values of $X_k$ of the pair of examples given by the i and j indices, and removing those entries if the two values are same. (For implementation, we recommend that $SPAN_k$ entries be lexically ordered by the beginning points and the end points of the spans. Pointers for the first occurrences of span beginners will speed up searching during run time). Each entry in the $SPAN_k$ represents two points of a span in the $X_k$ value line, along with a "merit" value to be scored when a cut point separates the end points of the span. (We shall use the term, merit, for the span merit here, which is not the contextual merit. The distinction will be clear from the context of discussion). It is now a simple matter of invoking an optimal interval covering technique to find the optimum c cut points for a given c. One has a choice of known dynamic programming techniques to achieve this with varying complexity. All are based on the same top level methodology.

Let all unique end point values of spans be ordered as $x_1, x_2, \ldots, x_n$. Let C(c, t) stand for an optimum c cuts whose last cut point is less than $x_{t+1}$. (There may be more than one such solution for a given c and t, but we choose to keep only lexically the earliest. This saves computation at the expense of not getting multiple solutions. Multiple solutions may be important for small c in practice, but by keeping a single solution does not compromise the optimality. For c greater than 2 or 3, there are rarely multiple solutions in practice, although one may wish to obtain some near optimum set of cuts as well to have wider choices in discretization). Optimum here means that the cut-merit score (or just "score") attained by the given cuts are the maximum possible. The score of a solution is just the sum of all the span merits of those spans that has its two end points separated by any cut points. With each C(c, t) we have the associated score and the c cut points that attain the score. We mention here that a simple greedy walk through the $SPAN_k$ list once produces the maximum score (just the sum of all span merits) and the number of necessary cuts, K, to attain it. For the sake of discussion, let's define $y_i=(x_i+x_{i+1})/2$, the mid points between the unique values, for $1 \leq i < n$, and use them for cut points. In practice, one may use any value between the adjacent unique values of $x_i$s as cut points, and use this fact to further tune the $y_i$'s after the optimal $y_i$'s are determined.

C(1, 1) has one associated cut point, $y_1$, and its score is the sum of the merits of all spans whose beginning point is $x_1$. Let $s_i$ be the sum of all merits of spans that are cut by $y_i$. Then, C(1, t) is the same as C(1, t') if t' is the smallest such that $s_{t'}$ is the maximum for all t'<t and $st' \geq s_t$, ($\geq$ here makes the lexically smallest solution. If all solution is desired, one uses > here, at the expense of keeping and processing multiple solutions through out the process), else C(1, t) has the cut point, $y_t$, and score $s_t$. Let NEWSPAN be a (properly reduced) subset of $SPAN_k$, we first formalize what is just said before describing the generic dynamic program technique for optimum interval covering.

Steps for Best New Cut Generation, BNC:

BNC0) Walk through NEWSPAN once and find the series of total merits $s_i$, of all spans cut singly by $y_i$.

BNC1) For all t, the best cut point less than $x_{t+1}$ is $y_{t'}$ where t' is the smallest such that $s_{t'}$ is the maximum for all $t' \leq t$ and hence $s_{t'} \leq s_{t'}$.

BNC2) Return for each t, the best cut point, $y_{t'}$, and the total (incremental) score gained by the cut point, $s_{t'}$.

Steps for Interval Covering Determination, (IC)

IC0) Find all unique points, order them and form $x_1, x_2, \ldots x_n$.

IC1 Find maximum (total) score, S, and maximum necessary cuts, K.

IC2) One Cut: Let NEWSPAN=SPANk and find C(1, t) for $1 \leq t < n$ by BNC.

IC3) Multiple Cuts: For $1 < c \leq K$, find C(c, t), for all t>c, from all C(c-1, t') where t'<t.

IC3.0) Let the set of all unique C(c-1, t), c-1<t<n, be CUTS

IC3.1) Define C"(c, t), for all c<t<n, as the current best candidates. (initially, just a holder)

IC3.2) Do for each C entry in CUTS, in order

IC3.2.1) Make NEWSPAN by removing from $SPAN_k$ all spans cut by C.

IC3.2.2) Apply BNC to NEWSPAN and obtain C"(c, t)s by appending the best new cuts to C and adding their incremental scores to the score of C, for all t.

IC3.2.3) Update C' by the winners of C' and C", for all t.

IC3.3) Return C' as C.

IC4) Return C(c, n-1), for $1 \leq c \leq K$ as the best c cut solutions.

This method can be implemented with the worst case run time complexity of order $n^3$ in a rather straightforward manner and of order $n^2 \log n$ if the Monge property is taken advantage of. If one is interested in up to some small number, c', of cuts c'<<K, IC3) terminates early, returning up to C(c', n-1). The average run time in this case is of order $n^2$.

To discretize all the numeric features, we first perform CMSG to find the contextual merits and SPAN. For each numeric feature, we specialize the SPAN to $SPAN_k$ and perform IC (or some desired variation to terminate early), and select a "desired" number of cut points. Each numeric feature is then symbolized with unique symbols (e.g. "0", "1", "2", ...., etc.) for intervals defined by its cut points. At this point an all symbolic contextual merit can be computed. We can refine the cut points of any numeric feature by returning the given feature from symbols back to the original numeric values, update the ramp threshold for the feature to the average interval size defined by its cut points, and perform CMSG and IC just for the feature. This refining process can be carried out for several rounds for all numeric features. Let us first discuss what we mean by "desired" number of cut points.

Figure 5:
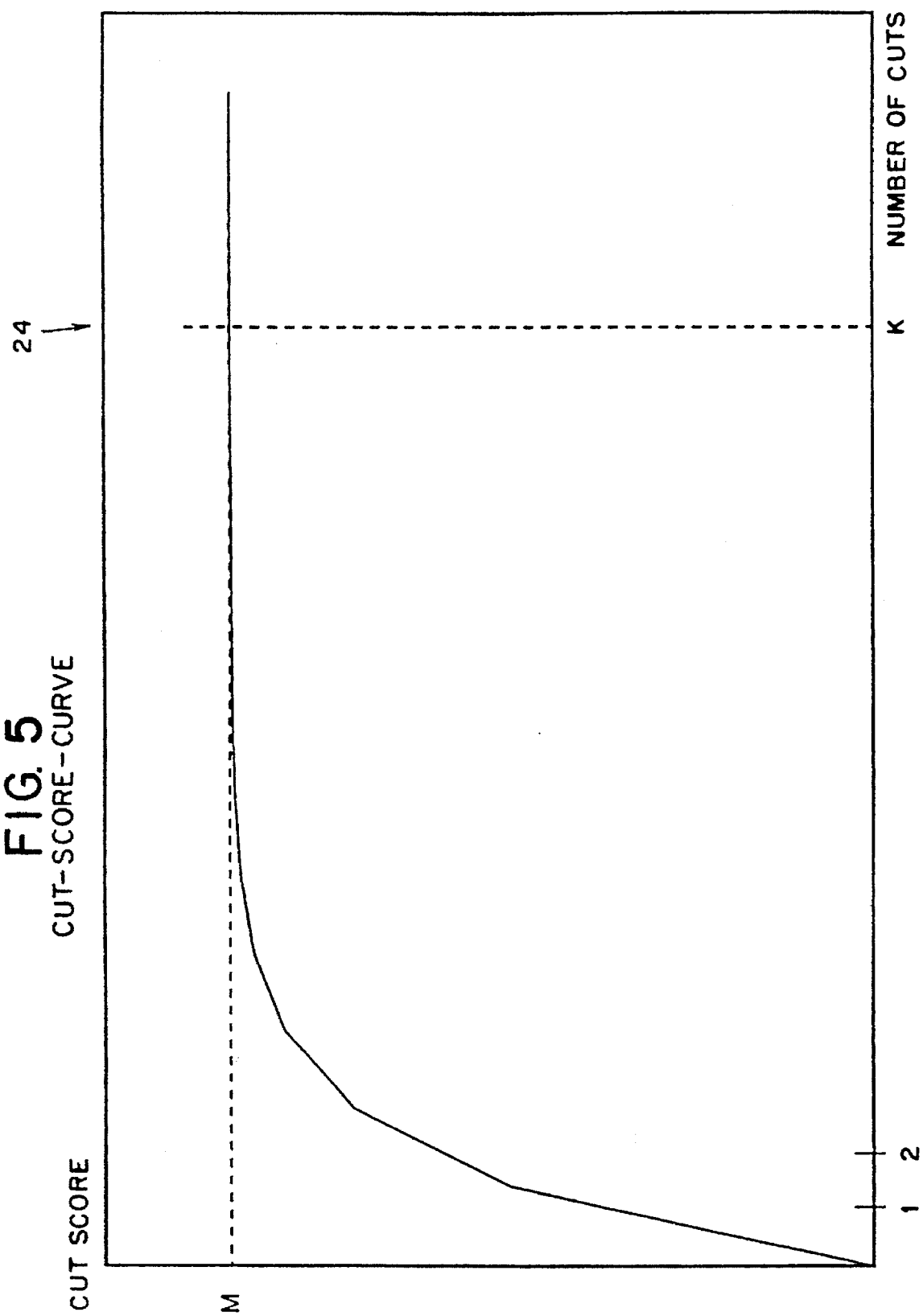
FIG. 5 shows a span (or cut) merit-score curve.

The scores attained by increasing cumber of cut points in the course of IC exhibit a typical behavior as shown in FIG. 5 (numeral 24). It resembles an "efficiency curve" that grows relatively fast to a knee and slowly reaches its maximum at the maximum necessary cuts, K, as the number of cuts increase. (The knee is generally sharper for more relevant features).

It is obviously a monotone increasing function (hence the Monge property), and in most cases convex as well, although there are exceptions. One would naturally select the number of cuts somewhere around the knee of such curve depending on the variable's relative contextual merit. (On the high side if the merit is high). This selection can be done either manually in an interactive IC where the progress of the score increase is monitored and IC terminated at a knee point, or by an automatic knee point selection mechanism. We present a heuristic mechanism that proved effective in our experience.

The idea is to pretend that the score curve of the increasing cuts is convex (the penalty for this simplifying assumption is not that critical in practice). Recall S and K of IC1). We define a point, ($\alpha \times K$, S), on the maximum score line, S, at some multiple (or fraction) of K, depending on the relative contextual merit based multiplier, alpha. We draw a conceptual line from origin to this point and find the highest point of the curve to this line. (The height of a point (x, y) to the line connecting origin to $(x_0, y_0)$ is proportional to $(x_0 y - y_0 x)$. The convenience of convexity is that we can stop developing the curve as soon as the next point on the curve has a smaller height, and select the previous point as the "desired" knee point. The $\alpha$ parameter has two components, $\alpha = \alpha_1 \beta$ and $\beta$ is chosen as a countermeasure for RE in the following way. The contextual merit developed in CMSG is the starting point. Let the sum of all symbolic feature contextual merits be $M_s$, and all numeric, $M_n$. Further, let $M_k$ be the contextual merit of the given numeric feature, and define modified-average-contextual-merit, M', as $$M' = (M_n + \alpha_2 \times M_s)/N_f$$

$$\beta = (M_k/M')^{\alpha_3}$$

These parameters are chosen for various heuristic reasons. $\alpha_2$ works against inflation and $\alpha_3$ against smoothing due to RE. $\alpha_2$ also works to counteract against VE. $\beta$ can be considered as representing the relative relevancy of $X_k$. $\alpha_1$ indirectly counters VE as well, but it has more to do with the preference for higher or lower number of cuts. These parameters are chosen for the problem and not varied for each feature during the process. In principle, we consider the feature analysis process as a series of interactive experiments using some variations of the above parameters to find ultimately the "best" minimal rule sets. If a domain expert interacts with the analysis guiding the experiments, the better. For the many benchmark problems including the ones reported in (Hong/R-MINI) and many real problems we applied this technique, results have been rather robust against these parameter settings. The best choices in our experience were:

$\alpha_1 = \frac{1}{4}$ to twice the number of numeric features
$\alpha_2 = 1.5, 2$ (mostly 1.5)
$\alpha_3 = 1, 1.5, 2$ (mostly 1.5)

Figure 6:
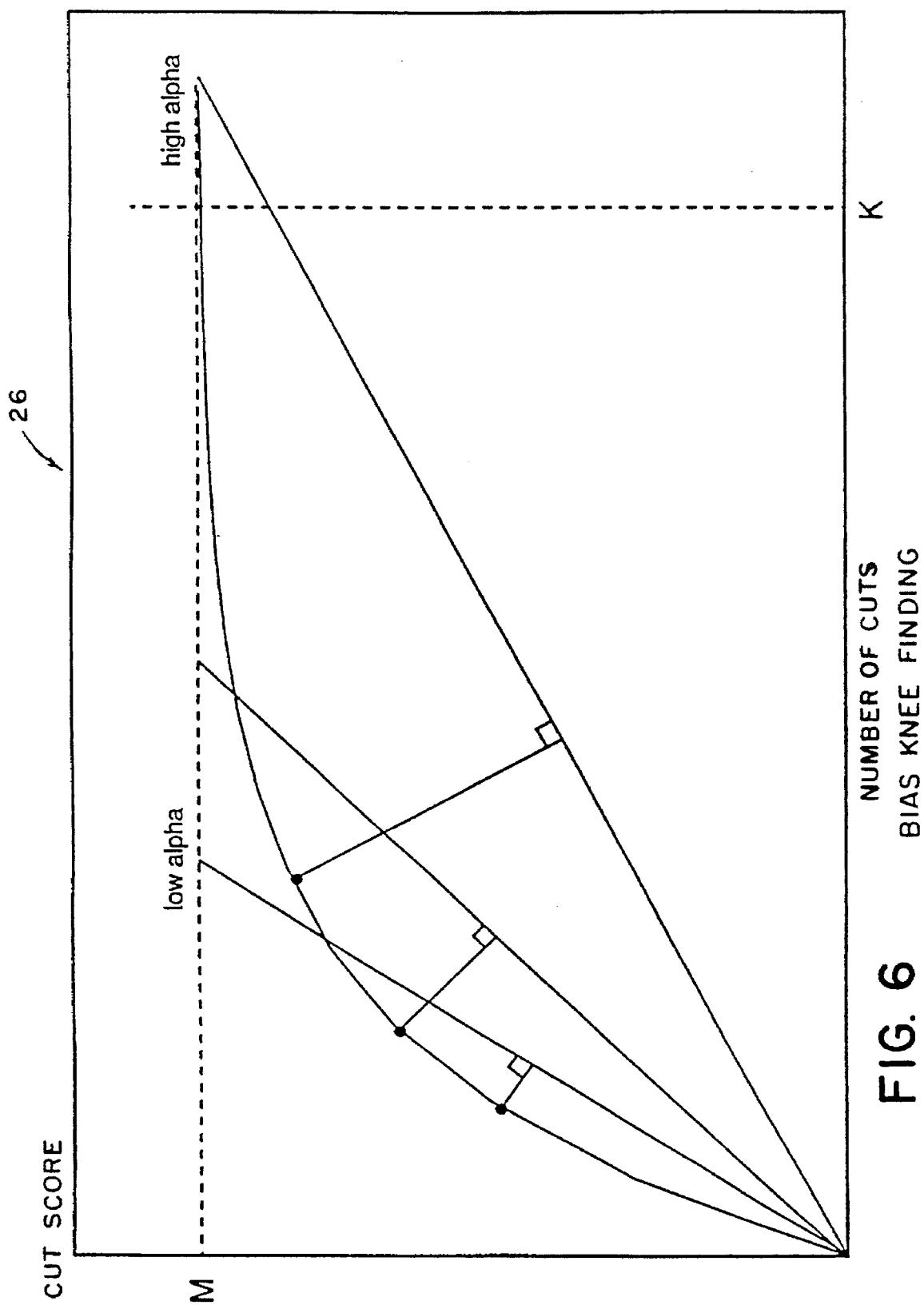
FIG. 6 illustrates a merit-biased knee point methodology.

The effect of this merit-biased knee point approach is shown in FIG. 6 (numeral 26) below.

Here is the basic method for discretizing the numeric features:

Steps for Numeric Feature Discretization (NFD):

NFD1) Set $t_i = \frac{1}{2}$ range size for each numeric feature.

NFD2) Perform CMSG and keep the contextual merits and SPAN.

If a reference pair of symbolic and numeric features are known to be comparable in their relative relevance, one may prune away some low merit features by normalized merits here and restart from NFD1).

NFD3) Set $\alpha_i$ parameters, say, (15, 1.5, 2).

NFD4) Set number of rounds, $n_r$, for discretization rounds.

NFD5) Initial round: For each numeric feature, $X_k$.

NFD5.1) Specialize SPAN to $SPAN_k$.

NFD5.2) Perform IC: Monitor the progress of merit increases as the number of cuts increase in IC2) and IC3). Terminate IC either by manual or automatic choice based on $\alpha_i$ parameters. Return the best cuts for the chosen c.

NFD6) Return the cuts for all numeric features as the $ROUND_0CUTS$.

NFD7) Using the cuts, symbolize all numeric features, obtaining an all symbolic representation of the problem.

NFD8) Determine conflicting example indices, if any, due to the discretization. (discussion later).

NFD9) Refining rounds: Do for $n_r$ rounds,

NFD9.1) Do for each numeric variable, $X_k$,

NFD9.1.1) Restore $X_k$ values to the original numeric ones.

NFD9.1.2) Recompute $t_k$ as the average interval size defined by the previous cuts for $X_k$.

NFD9.1.3) Perform CMSG and specialize SPAN to $SPAN_k$.

NFD9.1.4) Perform IC for $X_k$, similar to NFD5.2)

NFD9.1.5) Symbolize $X_k$ using the cuts: a new all symbolic representation for processing the next feature.

NFD9.2) Return $ROUND_iCUTS$.

NFD9.3) Determine conflicting example indices (as in NFD8).

NFD10) Return all $ROUND_iCUTS$ and their number of conflicting examples.

NFD11) If the the last round cut is satisfactory and there were no conflicting examples, the current symbolic representation may be used directly for an all symbolic rule/tree generation process.

In a variation we used successfully in many cases, we examine the number of cuts per feature in $ROUND_0$ and $ROUND_1$ along with the resulting symbolized feature merits at the end of these rounds, and manually fix the number of cuts for each feature for the subsequent rounds. The cuts often converge through a few rounds of refining, and this usually helps the convergence of cut values.

From the results of NFD, one has a choice of using different sets of cuts for the numeric features, although the last round results have been the best most often in our experience. One of the criteria for choosing a particular set of cuts is the number of conflicting examples, preferring the least. The conflicting examples can be removed from the rule/tree generation, or assigned to the class that has the majority of the group that conflicts, depending on the application. One can also assign the entire group that are in conflict (due to having the same symbolized feature values but different class labels) to the safest risk class when appropriate. In general, the greater the number of cuts, the less conflicts are generated by discretization. Also, when the problem has many features the number of conflicts tends to be near zero with any alphai choices.

The conflicting example indices computed in NFD8) and NFD9.3) can be gainfully used to accelerate the convergence of rounds as follows. Let extra SPAN be the set of triplets comprising the indices of the conflicting example pairs and a "penalty merit" value. One may use either the maximum of the span merits in the current SPAN or some fraction/ multiple of the mean span merits in the current SPAN for this purpose. The extra SPAN thus obtained can be appended to the SPAN, so that the IC will be more directed to separating the conflicting examples produced by the previous discretization round. We use this optionally when the problem is considered relatively noise free. (When the problem contains considerable noise, it would be even a good policy to let conflicting examples happen and remove them for the rule/tree generation as a pre-pruning against overfitting).

IX. Discussions on the discretization method

The key idea here is to use the contextual strength as a merit for separation of the values and make use of an optimal interval covering technique to find the optimal cut points. The main weakness of the method lies in determining the best number of cuts. We have shown how this can be accomplished either manually or automatically through a heuristic method. We advocate that the number of cuts be determined by the location of the "knee" of the score curve. This has an immediate benefit that overfitting to the numeric data is prevented.

In general, the more the number of cuts for a given numeric feature, the more the danger of overfitting, in the same loose sense of the term as used in the community. On the other hand, too small a number of cuts would cause loss of information. The best discretization would be the one that produces the best rules/trees in the end but one can at best obtain this a posteriori. If there existed an oracle that generated the best rules/trees from the symbolic examples, too many cuts are tolerable, but too little cuts would deprive it of necessary information to produce the best overall description. Controlling the number of cuts is not an issue in traditional methods since the discretization is passively determined by the rule/tree generation process. Our method often generates better or more meaningful cut points, but the choice of number of cuts remains heuristic.

The artificially numericized cases, Case7–13), all discretize correctly for the base variables, each with one of the cut points at the R value used for RANNUM, when either the number of cuts were manually fixed to be 1 or automatically chosen with small $\alpha_1$ value. And when they include the cuts at the R values, R-MINI produces the minimal EXOR rules. When the number of cuts for the base variables are two or three, the cuts miss the critical R value, and the resultant discretized problem does not lead to a desired minimal set of EXOR rules. However, if the number of cuts are further increased, they do include the correct points and then R-MINI is able to again produce the minimal solution. Missing the correct number of cuts by one or two is therefore worse than missing them by a few more. Although a few tries with different choices of cuts (manual or different α parameter settings) always produced satisfactory discretization in our experience, a further experience is in order for a better understanding.

Linear scaling of numeric values does not affect the contextual feature analysis. However, non-linear but order preserving scaling does. In one extreme, all the numeric values of a feature can be replaced with its rank number obtained from ordering all unique values of the feature, in a preprocess. Our experiments used the following generic normalization scheme for favorable outcomes. Let $x_1, x_2, \ldots$ be the unique values of a numeric feature in ascending order. Let their successive differences be $d_1, d_2, \ldots$. We let $d'_i = d_i^{1/p}$ for some small p, say, 2. The normalized values are $x'_i$ where $x'_1 = 0$, and $x'_i = x'_{i-1} + d'_i$. One can see that as p increases, the resulting $x'_i$ approaches the rank number of the extreme case. (When one does this, the cut points should be mapped back to the unnormalized values in a straightforward manner). This process tends to even out the distribution of the values. The same rationale that makes medians, and quartiles, etc. meaningful in statistics applies to this kind of normalization scheme that tends toward rank numbers.

If it is known from the domain knowledge that a certain cut point(s) is is significant for a feature but additional cut points are sought, our approach can gainfully accomodate this as follows. First, the average interval size defined by the given cut point(s) can be used as a better initial ramp threshold, $t_k$, for the feature's component distance. Second, the spans that are cut by the given points are removed from the $SPAN_k$ for the IC process, which then produces only the optimal additional cut points.

Figure 7:
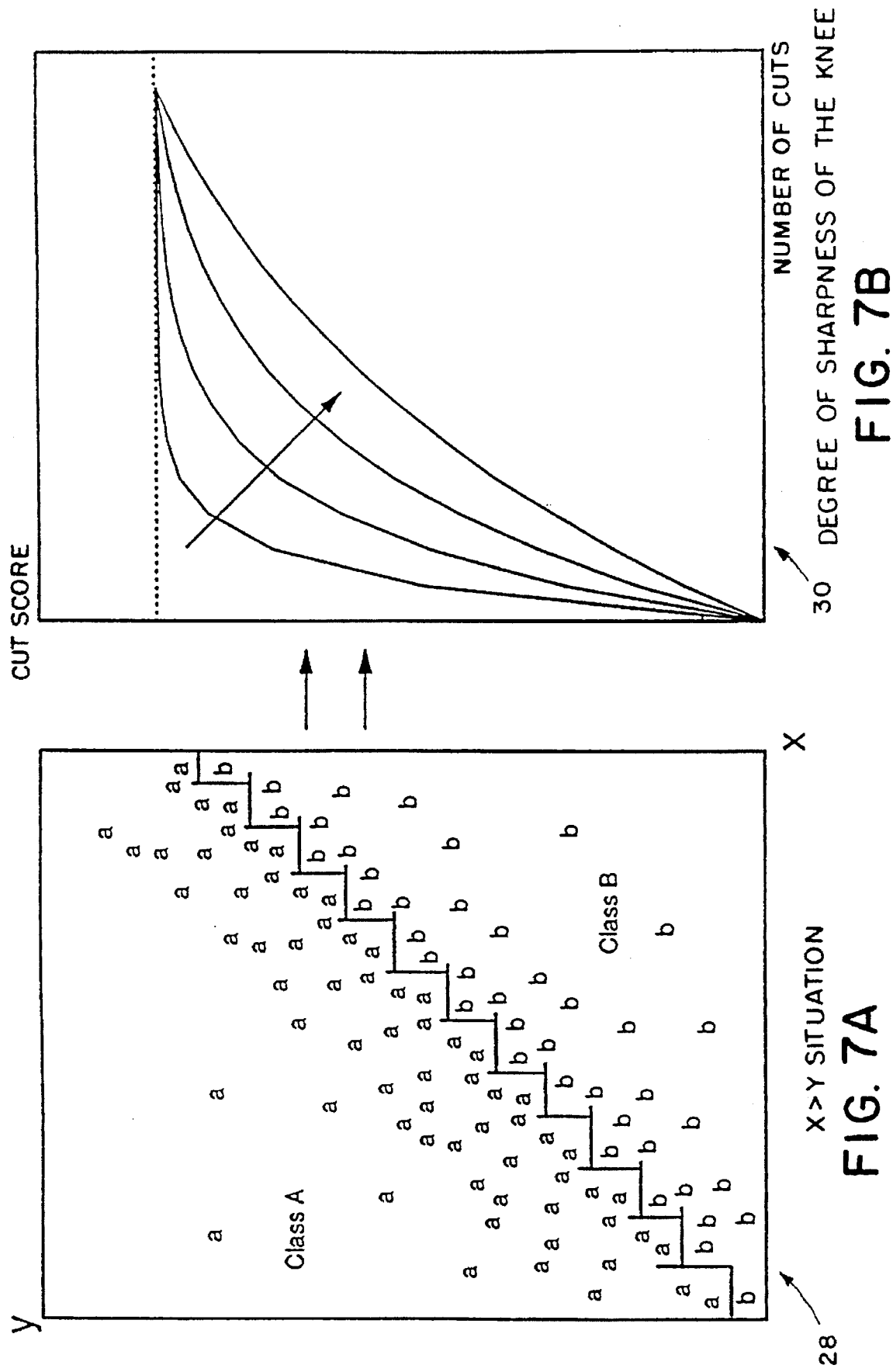
FIGS. 7a,b show cut merit score curves.

The cut merit score curve developed during the IC process conveys another useful information. Consider a case where, say X and Y are part of the numeric features and what really matters is not the values of Y and Y per se but whether X>Y. The best an ideal discretizer can do is to cut both X and Y very finely as depicted in FIG. 7a (numeral 28). The cut score curve for X or Y would be rather flat rising without a pronounced knee as shown as the bottom curve in FIG. 7b (numeral 30) which has a family of curves. We conclude that whenever a feature "needs to be" in (linear or other) functional combination with one or more other feature, the curve would tend to be toward the direction of arrow in the figure. (In this case, a new feature, X-Y would be superior to either X or Y or both. X-Y can be cut at 0 then). Although the converse is not true in general, the flat curve gives an indication that the feature is a good candidate for looking for linear (or other) combination with some other feature(s). In other words, this gives a hint as to when a hyperplane might be sought for a new feature. We hope to make use of this information to trigger synthesis of derived features in our future work.

X. Machine Implementation

Figure 8:
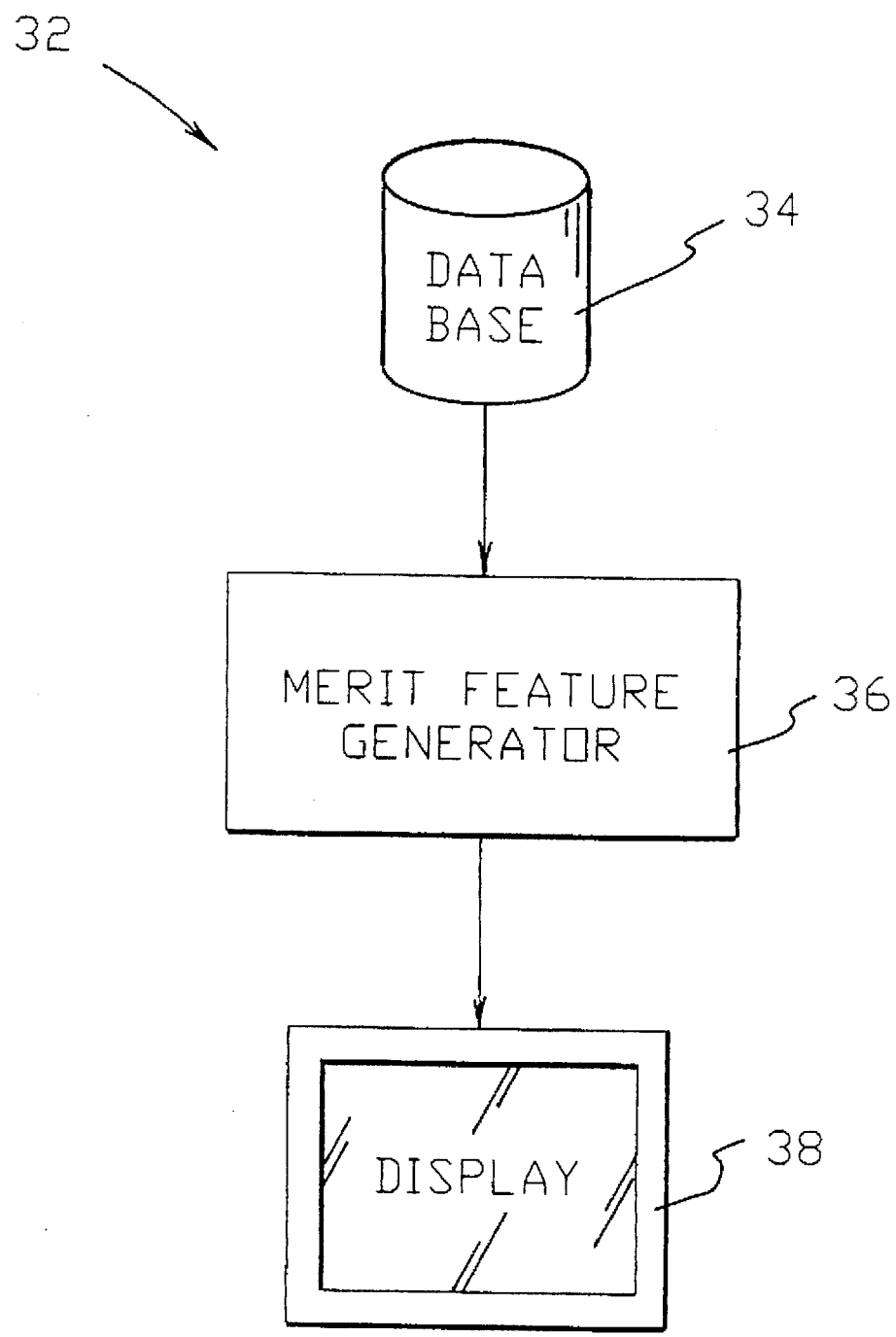
FIG. 8 shows a feature merit generator of the present invention.
Figure 9A:
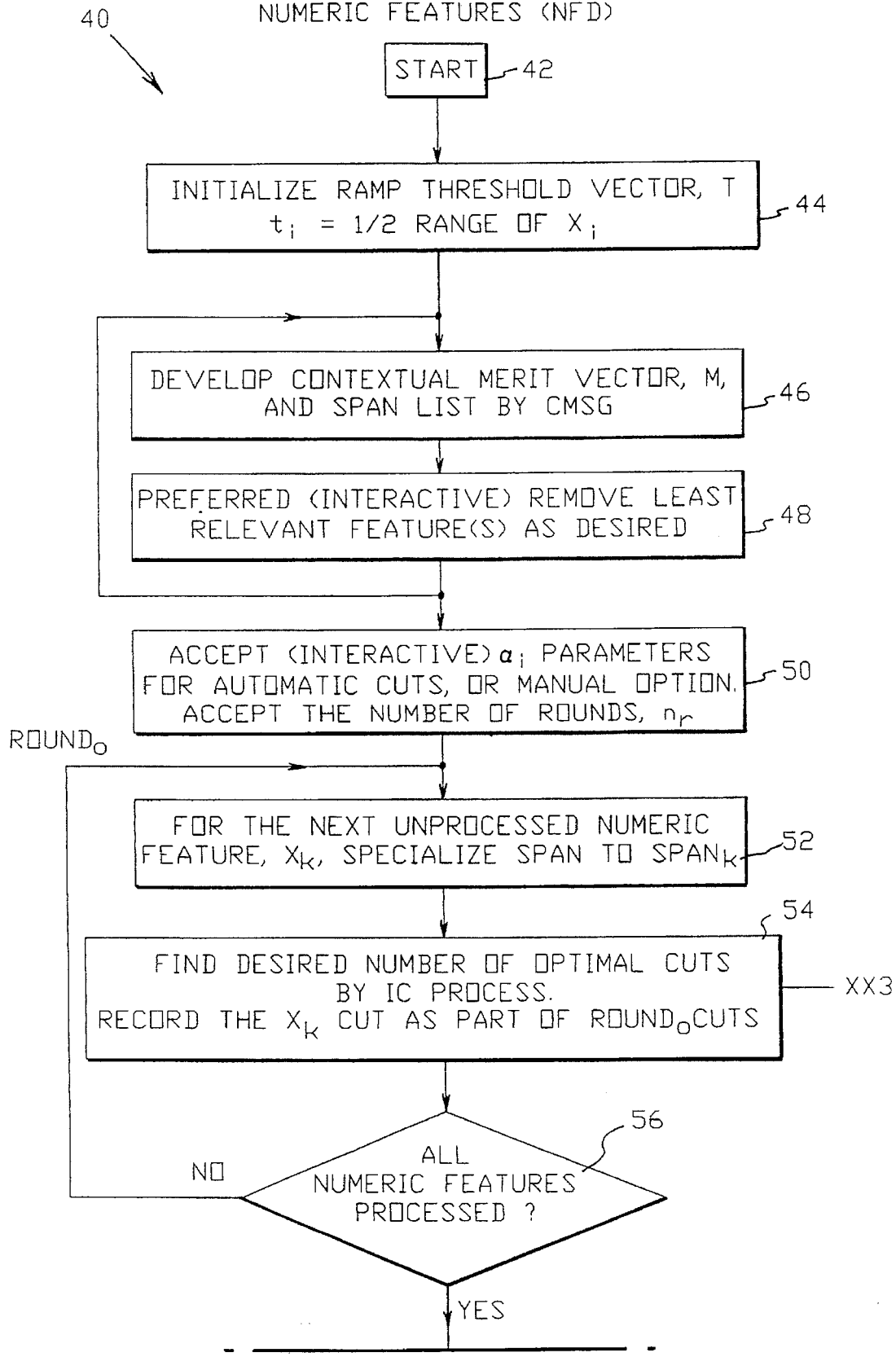
Figure 9B:
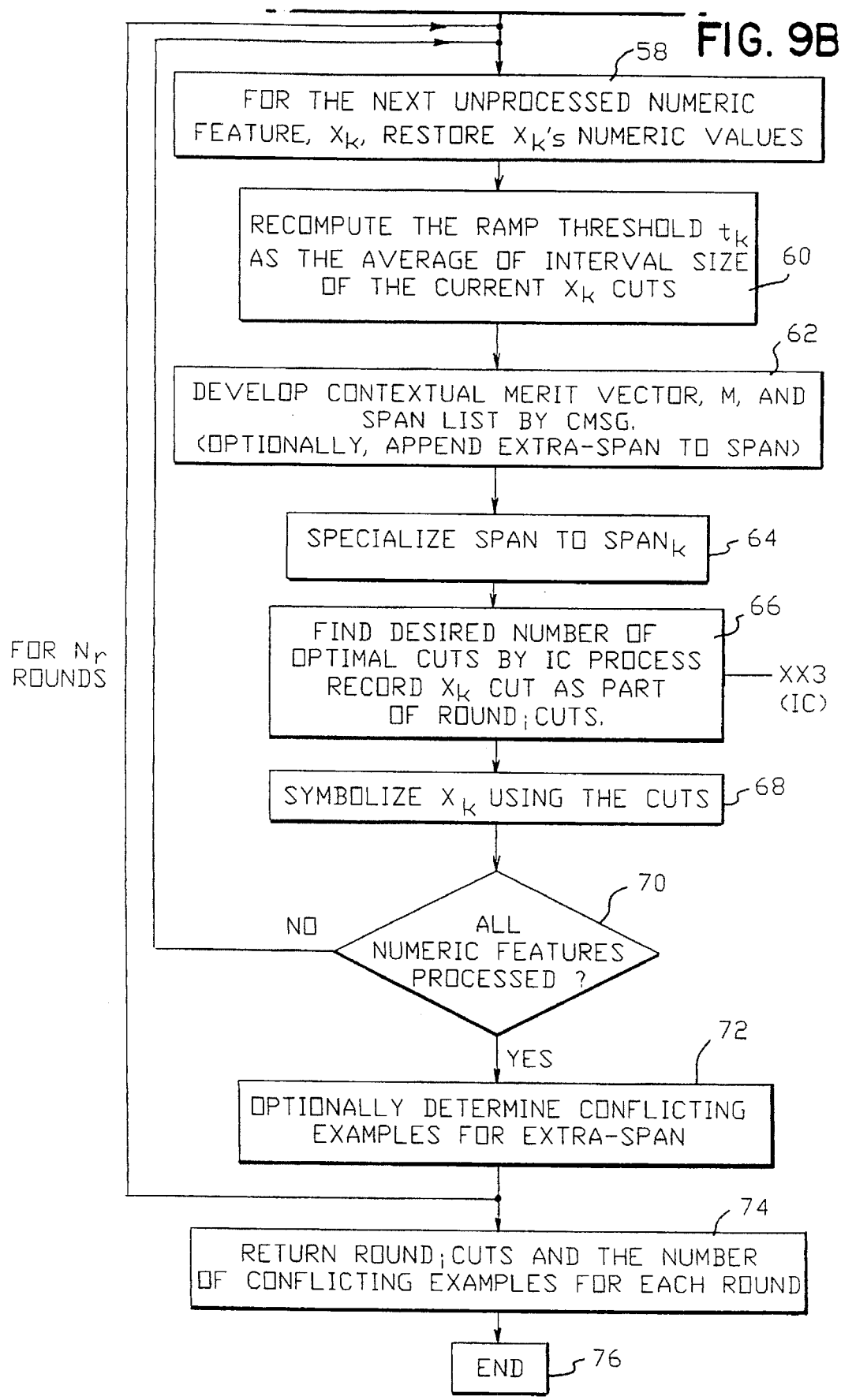
Figure 10B:
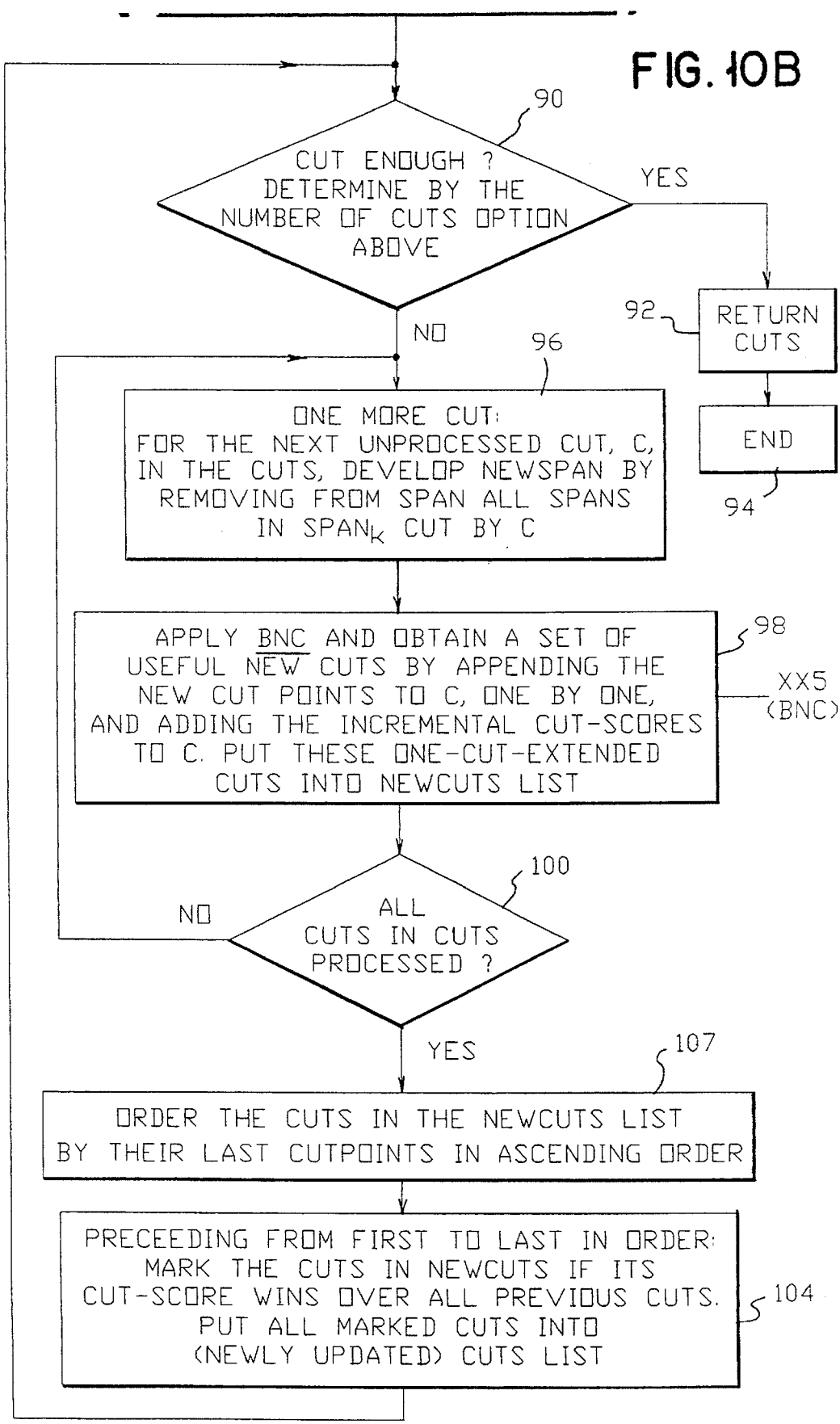
Figure 13:
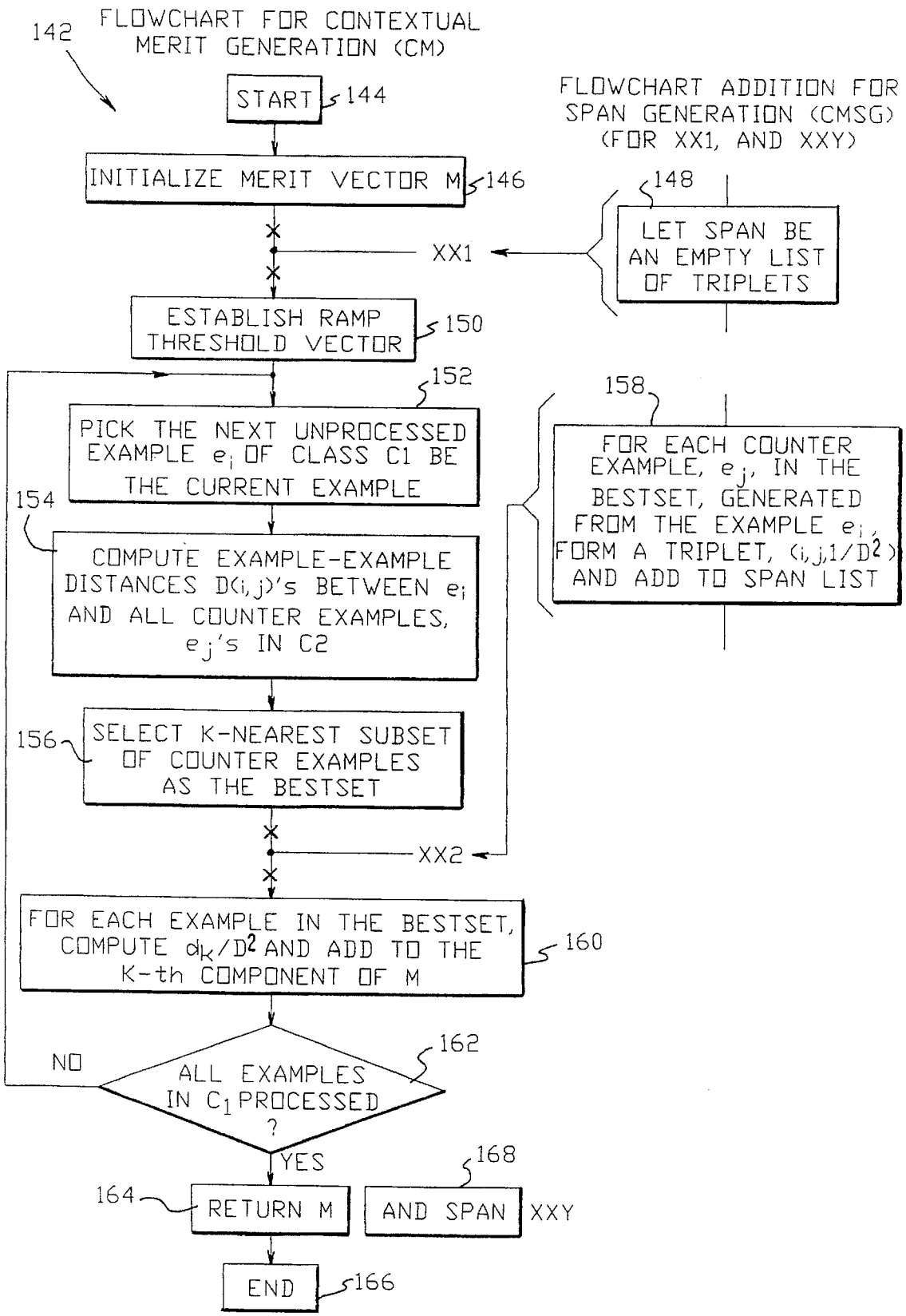

Attention is now directed to FIG. 8, which shows a preferred embodiment of a merit feature generator 32. In particular, the merit feature generator 32 comprises a data base 34 (preferably of the type exemplified in FIG. 1, supra), and an electronic processor 36 preferably comprising an IBM RS6000 computer and associated memory for computing the merit factor, and a conventional display 38.

In operation, the FIG. 8 merit feature generator 32 preferably executes steps implemented in C++ and in accordance with flowcharts 40, 78, 106, 128, 142 disclosed in FIGS. 9–13 (numerals 42–166). Note that these steps recapitulate preferred aspects of the invention, as set forth and explained in detail, supra.

XI. Conclusion

We have presented a new approach to evaluate features based on their contextual significance in distinguishing the classes. The main idea is to assign the contextual strength based on the component distance of a feature when all other features are "similar" by the distance between examples in different classes. What is accomplished without enumerating all distinct contexts is that the strength of contextual contribution to the class separation is effectively captured. We assert that this approach simulates a full look-ahead in a decision tree approach. Furthermore, we use the contextual strengths as merits for separating pairs of values for obtaining "optimal" cut points for discretizing numeric features. We have made use of a generic class of pathological problems derived from Exclusive-Or functions as the main vehicle to demonstrate the method.

We also proposed using a ramp function as a better model for component distance of numeric features. We identified the Variety Effect and the Ramp Effect that affect the relative merits of numeric features and presented heuristic countermeasures. For discretization, we proposed ways to determine a reasonable number of cuts about the knee of the cut merit score curve that effectively avoids the overfitting problem. We reported on a new value normalization scheme, that tends to even out the value distribution of a numeric feature, to an advantage in our experiments.

For generating decision trees, we believe using the highest contextual merit feature as the "best" test node for topmost some levels of the tree would be most effective. After some depth in a tree, each node already has significant context defined by the path to the node and any traditional "best" test selection can also be effective.

A reasonable information theoretic formulation for contextual information would be $$g(C:X_i) = \sum_{\forall F_i^*} W(|F_i^*|) \times I(C:X_i/F_i^*) \qquad (7)$$

where $W(|F_i|^*)$ is a weight function which depends on the size of the subset, $F_i^*$, and $I(C:X_i/F_i^*)$ is the traditional information between the class and $X_i$ given the subset of features, $F_i^*$. In general, as the given subset size increases, the entropy, $H(C:X_i/F_i^*)$, would decrease since more is known, and in turn $I(C:X_i/F_i^*)$, would also decrease. (Computing $I(C:X_i/F_i^*)$ involves ennumeration of all distinct values of $F_i^*$ and averaging the information between C and $X_i$ under each of these value settings, or the context. Any (non-zero) contributing term here means that there exist at least two examples in different classes such that their feature values for $F_i^*$ are identical to the given value setting. The distance between these two examples is necessarily less than $Nf-|F_i^*|$). We argue that the information conveyed by $X_i$ about C when a large portion of $F_i$ is already given should have a high weight since it imparts the information despite the large context. Hence, $W(|f_i^*|)$ should be a strictly increasing function of the size of $F_i^*$. Our 1/D (or $1/a^D$)

captures this rationale. The contextual merit defined by the CM method practically emulates the $\vartheta$ without enumerating the $F_i^*$. What is accounted for in CM are the non-zero information contributing terms. Of course, the result of CM is not the same as $\vartheta$, for CM does not explicitly compute entropy or information. CM also ignores small contexts by restricting the contributions to only the near by cases, i.e., smaller D cases. One sees that the traditional information, I(C:X) measures the information under the null context, corresponding to the empty subset of $F_i$.

I claim:

1. A program storage device readable by a machine, tangibly embodying a program of instructions executable by the machine to perform method steps for generating a feature variable ranking, said method steps comprising:
   1) representing within a data base of the computer a plurality of training examples, wherein a training example comprises a vector of feature variables accompanied by its class value;
   2) processing an example of a given class value of interest;
   3) generating a distance measure for the given class example of interest by a step of sequentially comparing corresponding elements of the feature variables to corresponding elements in at least one of a counter examples' vector of feature variables, the step of comparing comprising;
   4) generating merits to specified feature variables by finding that specified feature variables obligational contribution to a class discrimination in a context of the counter examples' corresponding feature variables.

2. A method according to claim 1, further comprising a step 5) of incorporation the distance measure in a rule for classifying the given class example to an appropriate class.

3. A method according to claim 1, wherein a feature variable comprises a symbolic feature.

4. A method according to claim 1, wherein a feature variable comprises a numeric feature.

5. A method according to claim 1, wherein a feature variable comprises a symbolic feature and a numeric feature.

6. A method according to claim 1, comprising a step of generating the distance measure D(i,j) between two examples (i,j) comprising a symbolic feature, by summing the feature, Xk, component distances of the two examples, dk(i,j):

$$D(i,j) = \sum_k d_k(i,j)$$

where for symbolic feature, $X_k$, dk(i,j)=0 if the k-th feature values for examples, i and j are the same, i.e. $x_{ki}=x_{kj}$ and $d_k$ (i,j)=1 if they are different.

7. A method according to claim 6, comprising a step of determining a specified number of the nearest counter examples per each example of the given class in terms of said distance, D.

8. A method according to claim 6, comprising a further step of attributing to each member of said nearest subset of counter examples, a contextual strength that is inverse of the distance measure, 1/D.

9. A method according to claim 6, wherein each nearest counter example's obligatorily contribution to a merit factor of each feature is accumulated by a step of distributing its contextual strength in proportion to the component feature distance measure as (1/D×($d_k$/D), this quantity being the class distinguishing obligation of the feature in the context of the two examples concerned.

10. A method according to claim 1, comprising a step of generating the distance measure D(i,j) between two examples (i,j) comprising a numeric feature and utilizing a ramp function, so that $$d_k(i,j)=(|x_{ki}-x_{kj}|)/t_k \text{ if } |x_{ki}-x_{kj}| \leq t_k$$

and $$d_k(i,j)=1 \text{ otherwise.}$$

11. A method according to claim 10 further comprising a step of obtaining the threshold value, $t_k$, for each numeric feature, for the said ramp function.

12. A method according to claim 1, further comprising a step for ranking the importance of feature variables in accordance with their distance measure.

13. A method according to claim 1, further comprising building a decision tree based on said feature ranking.

14. A method according to claim 1, comprising a step of introducing exogenous knowledge of a relevancy of numeric features vis-a-vis symbolic features, for calibrating the distance measure.

15. A method according to claim 1, comprising a step of treating multiple classes as a series of separate two class problems.

16. A method according to claim 1, comprising a step of utilizing said distance measure for gainfully discretizing numerical feature variables, when present, into meaningful intervals.

17. A method according to claim 16, comprising steps of
   1) obtaining a span list defined by the example indices, (i,j), and the contextual separation strength $1/D_{ij}^2$;
   2) specializing the span list for each numeric feature variable; and
   3) invoking an interval covering on the specialized span list for the purpose of generating optimal cut points.

18. A method according to claim 17, comprising a step for manually specifying the number of cuts through an interactive monitoring of the progress in cut-merit-score curve within the interval covering process.

19. A method according to claim 17, comprising a step of automatically determining the number of cuts corresponding to the knee area of the cut-merit-curve.

20. A method according to claim 17, comprising further refining steps for the cut points, by freeing the discretized features back to the original numeric values one feature at a time in turn, and re-discretizing.

21. A method according to claim 20, comprising accommodating extra knowledge of given important cut points for providing optimal additional cut points.

22. A method according to claim 1, comprising a further step of preprocessing the numerical values of a feature by non-linear scaling for the purpose of flattening the value distribution.

23. A method according to claim 1, comprising emulating an information theoretic quantity for Contextual Information defined as the weighted sum of the Information between class and a feature given a subset of the other features.

* * * * *